(12) United States Patent
Sommer et al.

(10) Patent No.: US 11,709,068 B2
(45) Date of Patent: Jul. 25, 2023

(54) SPATIAL AUDIO NAVIGATION

(71) Applicant: Apple Inc., Cupertino, CA (US)

(72) Inventors: Bruno M. Sommer, Cupertino, CA (US); Avi Bar-Zeev, Oakland, CA (US); Frank Angermann, Munich (DE); Stephen E. Pinto, Mountain View, CA (US); Lilli Ing-Marie Jonsson, Saratoga, CA (US); Rahul Nair, Daly City, CA (US)

(73) Assignee: Apple Inc., Cupertino, CA (US)

( * ) Notice: Subject to any disclaimer, the term of this patent is extended or adjusted under 35 U.S.C. 154(b) by 378 days.

(21) Appl. No.: 16/651,990

(22) PCT Filed: Sep. 25, 2018

(86) PCT No.: PCT/US2018/052642
§ 371 (c)(1),
(2) Date: Mar. 27, 2020

(87) PCT Pub. No.: WO2019/067443
PCT Pub. Date: Apr. 4, 2019

(65) Prior Publication Data
US 2020/0264006 A1    Aug. 20, 2020

Related U.S. Application Data

(60) Provisional application No. 62/564,197, filed on Sep. 27, 2017.

(51) Int. Cl.
*G01C 21/36*    (2006.01)
*H04W 4/029*    (2018.01)
(Continued)

(52) U.S. Cl.
CPC ..... *G01C 21/3629* (2013.01); *G01C 21/3688* (2013.01); *G01S 19/42* (2013.01);
(Continued)

(58) Field of Classification Search
CPC .... G01C 21/3629; G01C 21/34; G01C 21/36; G01S 19/42; G06F 3/011; H04R 2499/15; H04W 4/029
See application file for complete search history.

(56) References Cited

U.S. PATENT DOCUMENTS 9,464,912 B1    10/2016    Smus et al.
2004/0030491 A1    2/2004    Hull
(Continued)

FOREIGN PATENT DOCUMENTS

CN    101055494    10/2007
CN    101256082    9/2008
(Continued)

OTHER PUBLICATIONS

Wikipedia, "Microsoft HoloLens", Retrieved from https://en/wikipedia/org/w/index.php?title-Microsoft_HoloLens&oldid-799813806, Dec. 12, 2019, pp. 1-10.
(Continued)

*Primary Examiner* — Yosef K Laekemariam
(74) *Attorney, Agent, or Firm* — Robert C. Kowert; Kowert, Hood, Munyon, Rankin & Goetzel, P.C.

(57) ABSTRACT

Methods and apparatus for spatial audio navigation that may, for example, be implemented by mobile multipurpose devices. A spatial audio navigation system provides navigational information in audio form to direct users to target locations. The system uses directionality of audio played through a binaural audio device to provide navigational cues to the user. A current location, target location, and map information may be input to pathfinding algorithms to determine a real world path between the user's current location and the target location. The system may then use directional audio played through a headset to guide the user on the path from the current location to the target location. The system may implement one or more of several different
(Continued)

spatial audio navigation methods to direct a user when following a path using spatial audio-based cues.

19 Claims, 20 Drawing Sheets

(51) Int. Cl.
 *G01S 19/42*   (2010.01)
 *G06F 3/01*   (2006.01)
 *H04R 5/033*   (2006.01)
 *H04R 5/04*   (2006.01)
 *H04S 1/00*   (2006.01)
 *H04S 7/00*   (2006.01)

(52) U.S. Cl.
 CPC ............ *G06F 3/011* (2013.01); *H04R 5/033* (2013.01); *H04R 5/04* (2013.01); *H04S 1/007* (2013.01); *H04S 7/304* (2013.01); *H04W 4/029* (2018.02); *H04R 2420/07* (2013.01); *H04R 2499/15* (2013.01); *H04S 2400/11* (2013.01); *H04S 2400/13* (2013.01)

(56) References Cited

U.S. PATENT DOCUMENTS

| | | |
|---|---|---|
| 2008/0215239 A1 | 9/2008 | Lee |
| 2012/0136569 A1 | 5/2012 | Asakawa et al. |
| 2014/0185823 A1 | 7/2014 | Seligmann et al. |
| 2015/0030159 A1 | 1/2015 | Ozcan |
| 2016/0116298 A1 | 4/2016 | Clapper et al. |

FOREIGN PATENT DOCUMENTS

| | | | | |
|---|---|---|---|---|
| CN | 101960866 | | 1/2011 | |
| CN | 203313378 | * | 11/2013 | ............. G02B 27/01 |
| CN | 103503503 | | 1/2014 | |
| CN | 104321622 | | 1/2015 | |
| CN | 104335012 | | 2/2015 | |
| CN | 105372026 | | 3/2016 | |
| CN | 107036605 | | 8/2017 | |
| CN | 107077318 | | 8/2017 | |
| CN | 107111332 | | 8/2017 | |
| CN | 107111472 | | 8/2017 | |
| EP | 2 685 217 | * | 1/2014 | ............. G02B 27/01 |
| EP | 2685217 | | 1/2014 | |
| JP | 2003028663 | | 1/2003 | |
| JP | 2008023237 A | | 2/2008 | |
| JP | 2011257421 | | 12/2011 | |
| JP | 2015508487 | | 3/2015 | |
| KR | 10-2014-0129654 | | 11/2014 | |
| WO | 2008106680 | | 4/2008 | |
| WO | 2012125269 | | 9/2012 | |
| WO | 2013184450 | | 12/2013 | |
| WO | 2013184473 | | 12/2013 | |
| WO | 2014014145 A1 | | 1/2014 | |
| WO | WO 2016178820 | * | 4/2016 | ............. G01C 21/36 |
| WO | 2016069671 | | 5/2016 | |
| WO | 20160178820 | | 11/2016 | |

OTHER PUBLICATIONS

International Search Report and Written Opinion form PCT/US2018/052642, dated Jan. 8, 2019, pp. 1-16.
Office action from Japanese Application No. 2020-538765, dated Mar. 25, 2021, (English translation and Japanese Version), pp. 1-7.
Office Action from Korean Application No. 10-2020-7008896, (English Translation and Korean Version), dated Nov. 11, 2021, pp. 1-16.
Notice of Allowance dated Oct. 24, 2022 in Korean Patent Application No. 10-2020-7008896, Apple Inc.
Lee Tae Hoon, et al., "Binaural Navigation for the Visually Impaired with a Smartphone", ICMC 2015, Sep. 25-Oct. 1, 2015, CEMI, University of North Texas, pp. 286-289.
Chinese Office Action and Search Report from Chinese Patent Application No. 201880062894.3, dated Feb. 23, 2024, Apple Inc., 26 pages.

* cited by examiner

SPATIAL AUDIO NAVIGATION

This application is a 371 of PCT Application No. PCT/US2018/052642, filed Sep. 25, 2018, which claims benefit of priority to U.S. Provisional Patent Application No. 62/564,197, filed Sep. 27, 2017. The above applications are incorporated herein by reference. To the extent that any material in the incorporated application conflicts with material expressly set forth herein, the material expressly set forth herein controls.

BACKGROUND

Navigation applications for devices including but not limited to mobile multipurpose devices and vehicle A/V systems provide visual cues and/or vocal directions such as "turn left" or "turn right" to direct users to destinations. In the case of mobile multipurpose devices such as smartphones and tablet/pad devices, navigation applications may be used when walking or riding a bicycle to guide a user on a path through a city, park, etc. using visual cues and/or vocal directions. A mobile multipurpose device navigation application may also be used in a vehicle, either directly through the mobile multipurpose device or through an interface to the vehicle's A/V system, to direct a user to a destination while driving using visual cues and/or vocal directions.

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Mixed reality (MR) covers a spectrum from augmented reality (AR) systems that combine computer generated information (referred to as virtual content) with views of the real world to augment or add virtual content to a user's view of their real environment, to augmented virtual reality (AV) systems that combine representations of real world objects with views of a computer generated three-dimensional (3D) virtual world. The simulated environments of virtual reality and/or the mixed environments of mixed reality may thus be utilized to provide an interactive user experience for multiple applications.

SUMMARY

Various embodiments of methods and apparatus for spatial audio navigation are described. Embodiments of a spatial audio navigation system and spatial audio navigation methods are described that may, for example, be implemented by mobile multipurpose devices such as smartphones, pad devices, and tablet devices. The spatial audio navigation system provides navigational information in audio form to direct users to destinations such as real world locations, people, or objects. Instead of using vocal directions or relying on visual cues as in conventional navigation applications, the spatial audio navigation system uses directionality and distance of audio played through a binaural audio device (e.g., headphones, headsets, wired or wireless earbuds, etc., collectively referred to as a "headset") to provide navigational cues to the user.

Conventional navigation applications may provide vocal directions such as "turn left" or "turn right" to direct users to destinations. However, a user, for example while walking or riding a bike, may be listening to an audio source (e.g., music, an audio book, a phone call, etc.) while using a navigation application, and may prefer for the audio not to be interrupted by vocal directions. In addition, when on a phone call, vocal directions can interfere with the conversation, and/or the conversation can interfere with the vocal direction. Embodiments of the spatial audio navigation system and spatial audio navigation methods as described herein instead use directionality and distance of sound played through a binaural audio device to provide navigational cues to the user. Embodiments thus use the spatial location of the apparent source of a sound to guide the user in a certain direction. For example, to guide the user on a path while listening to music, the apparent source of the music may be placed in front of the user to guide the user along the path, and moved to the side of the user to prompt the user to make a turn on the path. Thus, the music is not interrupted, and embodiments provide a subtler method to convey navigational information than conventional navigation applications. The same can be done with other audio sources including but not limited to audio books, telephone conversations, simulated or captured ambient noise, simulated sounds such as tones, bells, sirens, or white noise, or recorded sounds such as the sound of a railroad train or a pack of wolves.

In addition, psychologically a user may tend to assume vocal directions are correct and thus follow the directions without much thought, potentially causing accidents. By using directionality and distance of sound as an audio cue to guide a user instead of vocal directions to tell a user, it is up to the user to determine if it is safe to follow the directional audio cue. A voice does not tell the user to do something (e.g., "turn left" or "turn right"); instead, the user is following the directional audio cue. When following something such as a directional audio cue, a different psychology comes into play than when listening to spoken commands.

In embodiments of the spatial audio navigation system, a current location, target location, and map information may be input to pathfinding algorithms to determine a real world path between the user's current location and the target location. The spatial audio navigation system may then use directional audio played through the headset to guide the user on the path from the current location to the target location. The user's current location and direction of motion as determined by the mobile multipurpose device and head orientation and movement as determined by the headset are used by the spatial audio navigation system to adjust the perceived or virtual directionality and distance of the audio, for example by adjusting the volume of the left and right audio channels as the user moves in the real world to guide the user along the path to the target location. Instead of or in addition to adjusting the volume, other aspects of the audio may be attenuated to affect the virtual directionality and distance of the audio, including but not limited to frequency and reverberation. Other aspects of the audio may be adjusted based on the inputs, such as the particular sound being played, to assist in guiding the user to the target location.

The spatial audio navigation system may output audio to the headset via a wired or wireless connection so that the user hears the sound in a spatial audio sense. In other words, the user hears the sound as if the sound were coming from a real world location with accurate distance and direction. For example, the system may play a sound through the headset so that the user hears the sound coming from their left, their right, straight ahead, behind, or at some angle. The direction that the sound seems to be coming from may change to guide the user on the path. For example, as the user approaches a left turn on the path, the sound may be moved to the left by increasing the volume of the left audio output channel and/or by decreasing the volume of the right audio output channel. In some embodiments, the system may modulate the volume of the sound to give the user a sense of distance, for example to make it seem as if the sound was coming from three feet, ten feet, or fifty feet away. Instead of or in addition to adjusting the volume, other aspects of the left and right audio channels may be attenuated to affect the virtual directionality and distance of the audio, including but not limited to frequency and reverberation. In some embodiments, the system may change the sound based on detected events, for example by playing an alert or warning sound if the user has missed a turn or is approaching an obstacle.

Embodiments of the spatial audio navigation system may implement one or more of several different spatial audio navigation methods to direct a user when following a path using spatial audio-based cues. The methods may include, but are not limited to, the following.

Continuous path tracing—A sound is moved such that it continuously follows the path. When the sound reaches the end of the path, it returns to the beginning of the path and the process repeats.

Discrete path tracing—A sound is moved in discrete intervals along the path. When the sound reaches the end of the path, it returns to the beginning of the path and the process repeats.

Local direction of currently playing sound—The user is listening to an audio source such as music, a podcast, or a phone call. Instead of the user hearing the audio source as simple stereo sound through the headset, the spatial audio navigation system positions the sound at some distance away from the user in the direction that the user should move to follow the path. The sound may be moved to the left or right to follow bends or turns in the path.

Sound directionality—A sound moves from behind to in front of the user towards the direction that the user needs to move to follow the path, stops, and then repeats. The sound is positioned at some distance away from the user's head, and may be positioned either on their left or right, for example depending on ear dominance.

Sound tunneling—Ambient noise in the environment is sampled or simulated. For example, if the user is in a forest the ambient noise may include the rustling of trees, or if the user is in a city the ambient noise may include crowd and traffic sounds. This ambient noise is then played by the spatial audio navigation system. Obstacles to the sound are placed by the spatial audio navigation system that completely surround the user except in the direction that the user should move to follow the path. This causes a sound tunneling effect that prompts the user to follow the path in the direction of the ambient noise.

Ambient sound occlusion—As above, the appropriate ambient noise in the environment is sampled or simulated by the spatial audio navigation system and played to the user. However, an obstacle is placed in the direction the user should move to follow the path and oriented to face the user. This blocks out the ambient noise in the direction that they should move, causing an effect where there is a gap in the ambient noise that prompts the user to follow the path in the direction of the absence of or gap in ambient noise.

Sound chasing—A sound (e.g., the sound of a pack of wolves, train, etc.) is played at some distance behind the user; as the user moves, the sound "chases" or follows the user to push the user along the path.

While embodiments are primarily described in which the spatial audio navigation system is implemented in a mobile multipurpose device connected by a wired or wireless connection to a headset worn by the user, embodiments of a spatial audio navigation system may also be implemented in VR/MR systems implemented as head-mounted displays (HMDs) that include location technology, head orientation technology, and binaural audio output; speakers integrated in the HMD may be used as the binaural audio device, or alternatively an external headset may be used as the binaural audio device. Note that HMDs and mobile multipurpose devices such as smartphones and pads may be referred to as "mobile devices." Further, embodiments may be used in a mobile multipurpose device or other portable computing device such as a notebook or netbook computer without a headset in which two or more speakers of the device are used to output the navigational information in audio form, and thus serve as the binaural audio device. More generally, embodiments may be implemented in any device or system that includes binaural audio output and that provides head motion and orientation tracking.

In addition, embodiments may be adapted to work in vehicle A/V systems in which vehicle location and orientation technology is used to determine location, motion, and orientation of the vehicle and in which the vehicle's "surround" speaker system is used as the binaural audio device to output the directional sounds to guide the user while driving to a target location, and in homes or other buildings or environments in which a mobile multipurpose device or other technology is used to determine the location, orientation, and movement of the user while a "surround" speaker system is used as the binaural audio device to output the directional sounds to guide the user.

Figure 1A:
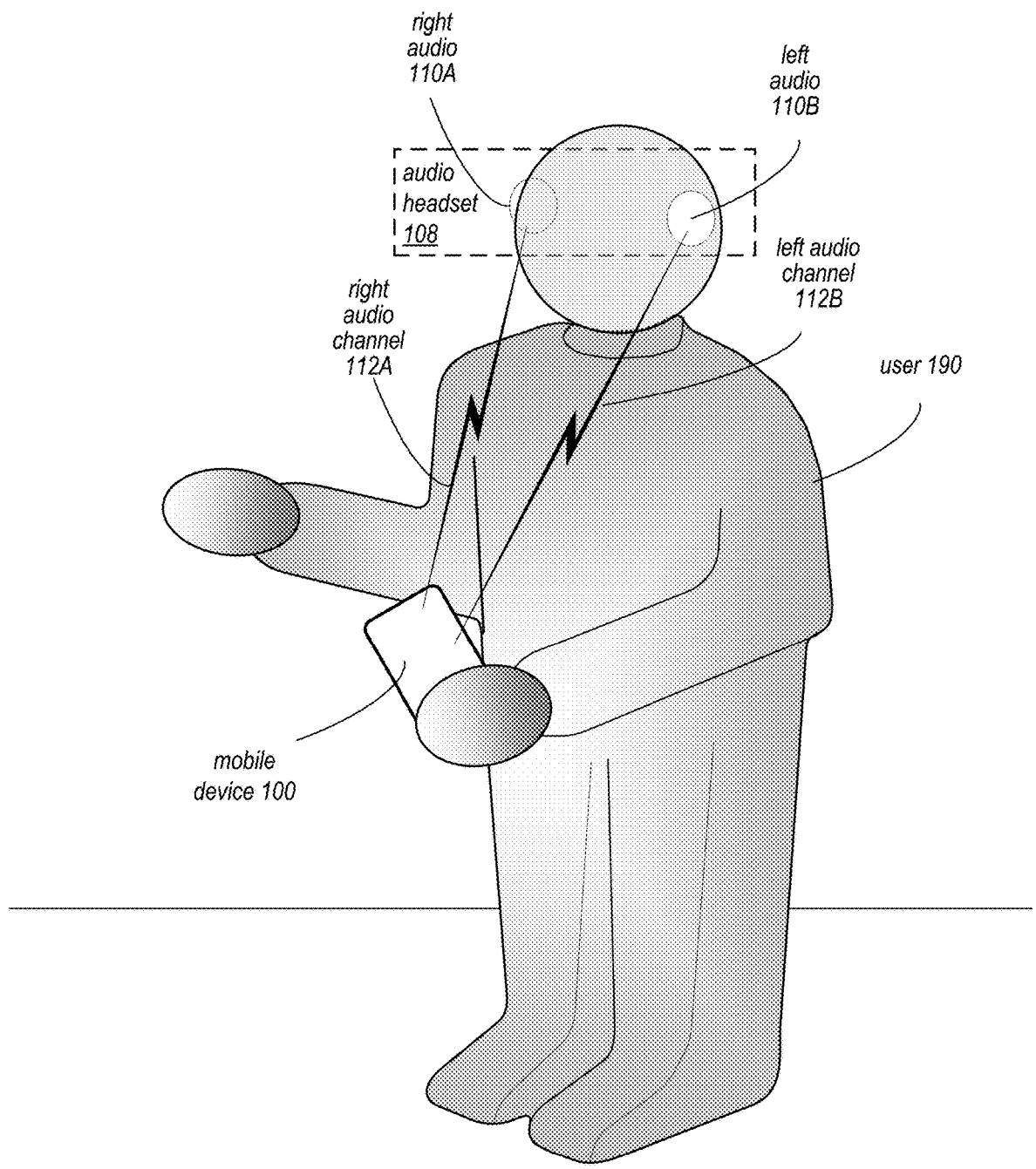
FIGS. 1A and 1B illustrate embodiments of an example mobile multipurpose device that may implement embodiments of the spatial audio navigation system and methods as described herein.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for spatial audio navigation are described. Embodiments of a spatial audio navigation system and spatial audio navigation methods are described that may, for example, be implemented by mobile multipurpose devices. The spatial audio navigation system provides navigational information in audio form to direct users to destinations such as real world locations, people, or objects. Instead of using spoken commands as in conventional navigation applications, the spatial audio navigation system uses directionality of audio played through a binaural audio device (e.g., headphones, headsets, wired or wireless earbuds, etc., collectively referred to as a "headset") to provide navigational cues to the user.

The headset includes a left audio output component worn in or over the user's left ear, and a right audio output component worn in or over the user's right ear. Directionality of sound may, for example, be provided by increasing the volume of the sound output by one of the audio output components and/or decreasing the volume of the sound output by the other audio output component. If both components are at the same volume level, the sound may seem to be coming from in front of the user. If the volume is above zero in the left component and at zero in the right component, the sound may seem to be coming from the direct left of the user. If the volume is above zero in the right component and at zero in the left component, the sound may seem to be coming from the direct right of the user. If the volume is higher in the left component and lower in the right component, the sound may seem to be coming from a position in front of and to the left of the user. If the volume is higher in the right component and lower in the left component, the sound may seem to be coming from a position in front of and to the right of the user. In addition, the sound output by one or both components may be modulated to make it seem that the sound is coming from behind the user. In addition, modulating the volume of one or both components may provide a sense of distance; at a lower volume, the sound may seem to be coming from farther away; at a higher volume, the sound may seem to be coming from nearby. Instead of or in addition to adjusting the volume, other aspects of the left and right audio channels may be attenuated to affect the virtual directionality and distance of the audio, including but not limited to frequency and reverberation.

Inputs to the spatial audio navigation system may include a real-world target location (typically provided by the user through an interface to an application on the mobile multipurpose device), a real-world current location of the user determined by the mobile multipurpose device, motion and orientation of the user's head, real-world map information typically provided by a map or navigation application on the mobile multipurpose device, and an audio source. The target location may be a place, a person (e.g., a person holding another mobile multipurpose device that can communicate its location to the user's mobile multipurpose device), or an object (e.g., a set of keys) for which the location is known to or discoverable by the spatial audio navigation system. A user's mobile multipurpose device uses inputs from one or more position sensors to calculate its location in the real world. The position sensors may include one or more of, but are not limited to, GPS (global positioning system) technology sensors, dGPS (differential GPS) technology sensors, cameras, indoor positioning technology sensors, SLAM (simultaneous localization and mapping) technology sensors, etc. The headset worn by the user includes motion sensors used to detect and track motion and orientation of the user's head with respect to the real world. The motion sensors may include one or more of, but are not limited to, IMUs (inertial measurement units), gyroscopes, attitude sensors, compasses, etc. The real-world map information may include, but is not limited to, information about routes between locations, appropriate passable areas (sidewalks, streets, doors, etc.), and obstacles (walls, buildings, fences, etc.). The audio source may, for example, include ambient noise sampled from or simulated for the environment, an audio source that the user is listening to (e.g., music, podcasts, audio books, radio broadcasts, phone calls, etc.), or various pre-recorded or generated sounds.

The current location, target location, and map information may be input to pathfinding algorithms to determine a real world path between the user's current location and the target location. The spatial audio navigation system may then use directional audio played through the headset to guide the user on the path from the current location to the target location. The user's current location and direction of motion as determined by the mobile multipurpose device and head orientation and movement as determined by the headset are used by the spatial audio navigation system to adjust the virtual directionality and distance of the audio as the user moves in the real world to guide the user along the path to the target location. In some embodiments, the virtual directionality and distance of the audio may be adjusted by attenuating one or more aspects of audio output to the left and/or right audio channels, including but not limited to volume, frequency, and reverberation. Other aspects of the audio may be adjusted based on the inputs, such as volume and type of audio, to assist in guiding the user to the target location.

The spatial audio navigation system may output audio to the headset via a wired or wireless connection so that the user hears the sound in a spatial audio sense. In other words, the user hears the sound as if the sound were coming from a real world location with accurate distance and direction. For example, the system may play a sound through the headset so that the user hears the sound coming from their left, their right, straight ahead, behind, or at some angle. The direction that the sound seems to be coming from may change to guide the user on the path. For example, as the user approaches a left turn on the path, the sound may be moved to the left. In some embodiments, the system may modulate the volume of the sound to give the user a sense of distance, for example to make it seem as if the sound was coming from three feet, ten feet, or fifty feet away. Instead of or in addition to adjusting the volume, other aspects of the audio may be attenuated to affect the virtual distance of the audio, including but not limited to frequency and reverberation. In some embodiments, the system may change the sound based on detected events, for example by playing an alert or warning sound if the user has missed a turn or is approaching an obstacle.

Embodiments of the spatial audio navigation system may implement one or more of several different spatial audio navigation methods to direct a user when following a path using spatial audio-based cues. The methods may include, but are not limited to, continuous path tracing, discrete path tracing, local direction of currently playing sound, sound directionality, sound tunneling, ambient sound occlusion, and sound chasing methods. These various spatial audio navigation methods and other methods that may be used in embodiments are further described in relation to FIGS. 5C through 5I, FIGS. 6A through 6D, and 7A through 7C.

Figure 1B:
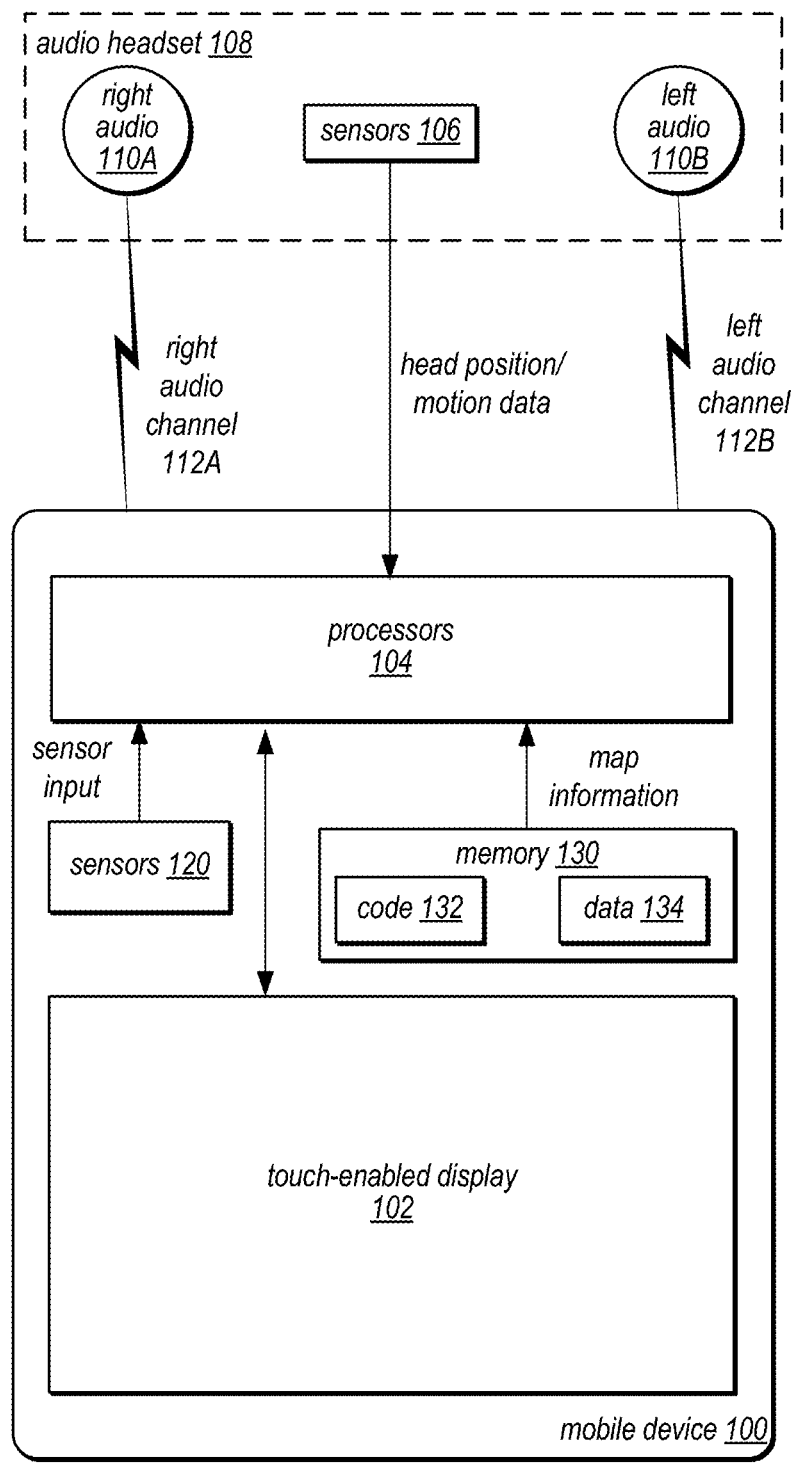
Figure 2A:
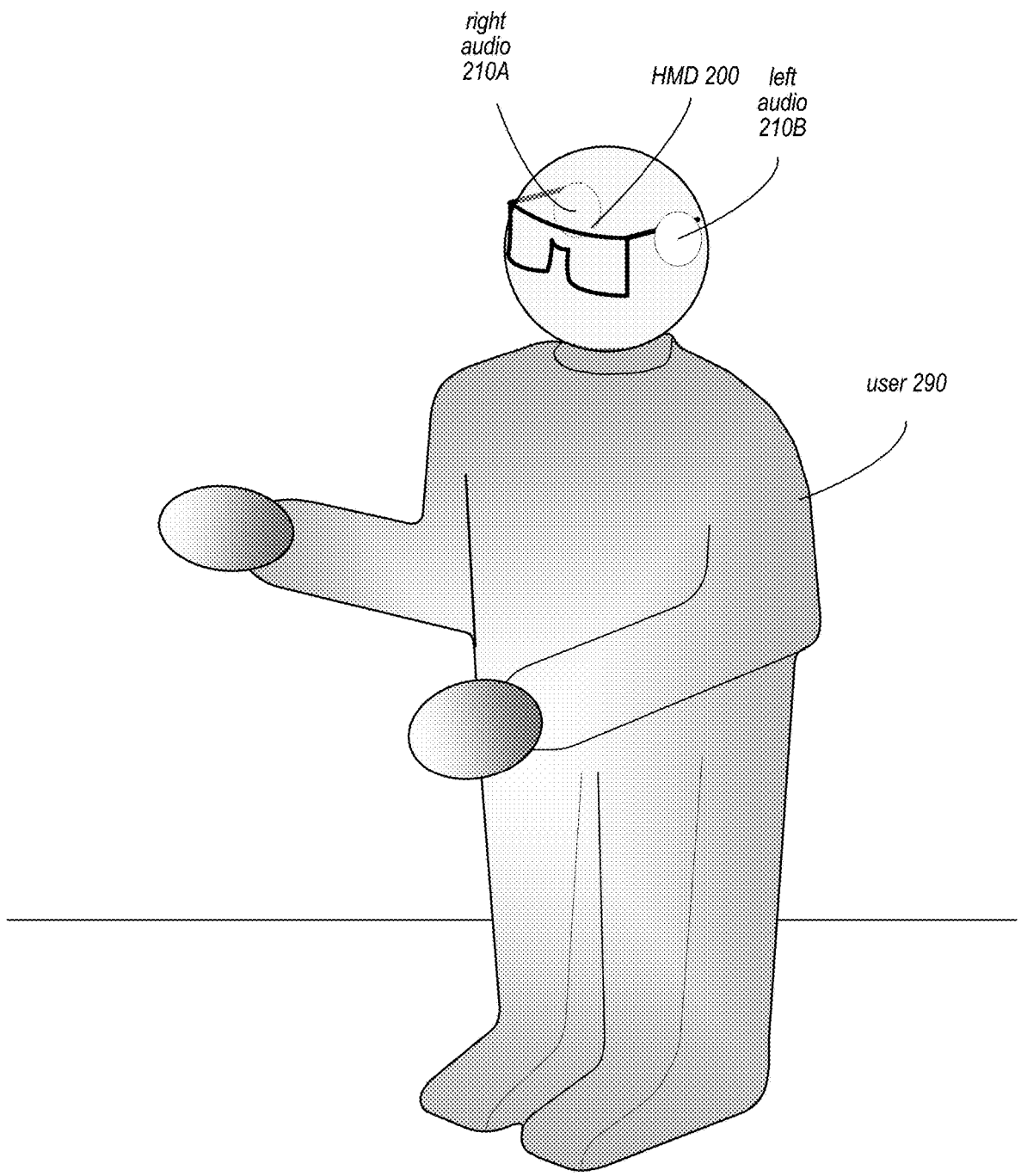
FIGS. 2A and 2B illustrate embodiments of an example VR/MR system that may implement embodiments of the spatial audio navigation system and methods as described herein.
Figure 2B:
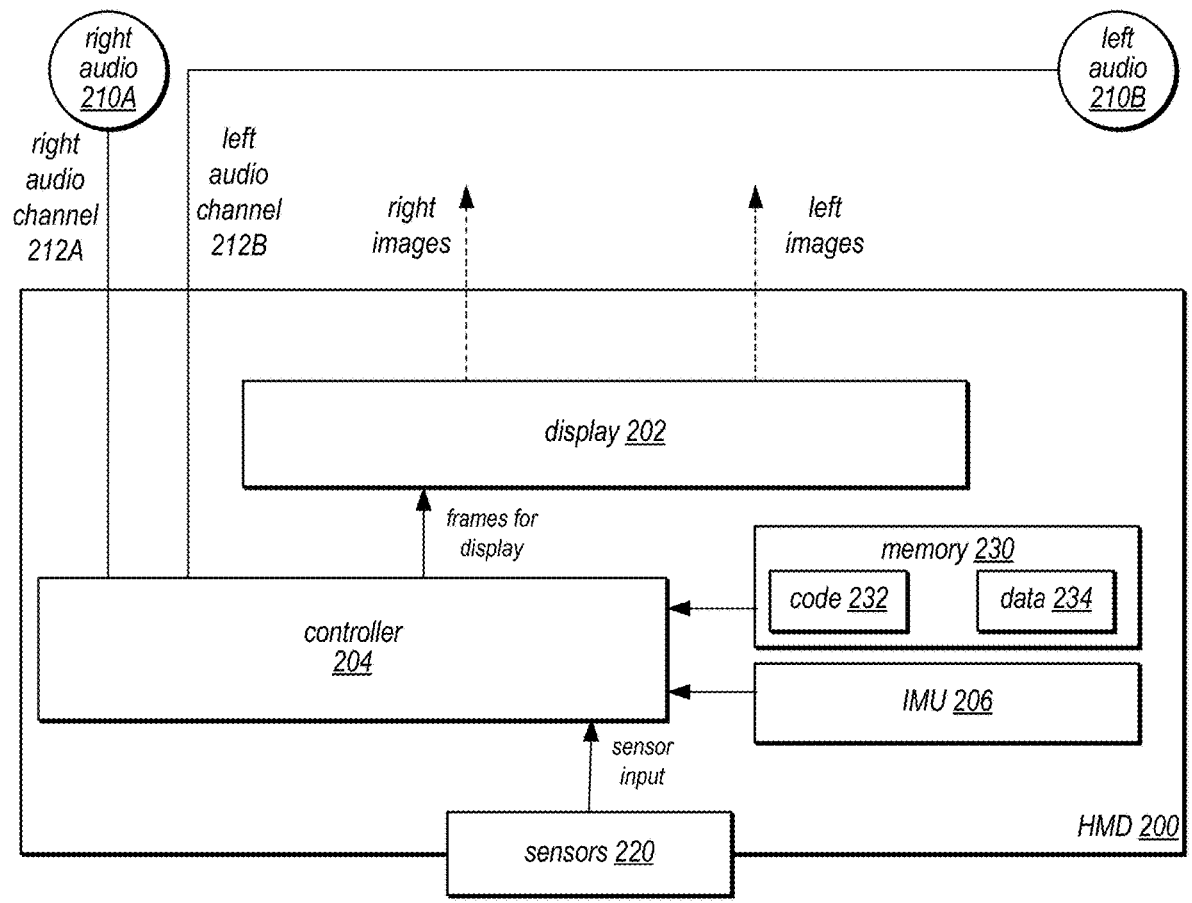

While embodiments are primarily described in which the spatial audio navigation system is implemented in a mobile multipurpose device connected by a wired or wireless connection to a headset worn by the user, for example as illustrated in FIGS. 1A and 1B, embodiments of a spatial audio navigation system may also be implemented in VR/MR systems implemented as head-mounted displays (HMDs) that include location technology, head orientation technology, and binaural audio output, for example as illustrated in FIGS. 2A and 2B; speakers integrated in the HMD may be used as the binaural audio device, or alternatively an external headset may be used as the binaural audio device. Further, embodiments may be used in a mobile multipurpose device or other portable computing device such as a notebook or netbook computer without a headset in which two or more speakers of the device are used to output the navigational information in audio form, and thus serve as the binaural audio device. More generally, embodiments may be implemented in any device or system that includes binaural audio output and that provides head motion and orientation tracking.

In addition, embodiments may be implemented in vehicle A/V systems in which vehicle location and orientation technology is used to determine location, motion, and orientation of the vehicle and in which the vehicle's "surround" speaker system is used as the binaural audio device to output the directional sounds to guide the user while driving to a target location, and in homes or other buildings or environments in which a mobile multipurpose device or other technology is used to determine the location, orientation, and movement of the user while a "surround" speaker system is used as the binaural audio device to output the directional sounds to guide the user.

FIGS. 1A and 1B illustrate embodiments of an example mobile multipurpose device that may implement embodiments of the spatial audio navigation system and methods as described herein. As shown in FIG. 1A, a mobile multipurpose device 100 such as a smartphone, tablet, or pad device may be carried by a user 190, for example in the hand or in a pocket. The device 100 may include one or more position sensors that enable a real-world location of the device 100 to be determined, for example GPS (global positioning system) technology sensors, dGPS (differential GPS) technology sensors, cameras, indoor positioning technology sensors, SLAM (simultaneous localization and mapping) technology sensors, etc. A binaural audio device (e.g., headphones, headsets, wired or wireless earbuds, etc.), referred to as a headset 108, may be worn by the user 190. The headset 108 may include right audio 110A and left audio 110B output components (e.g., earbuds) and one or more motion sensors used to detect and track motion and orientation of the user 190's head with respect to the real world. The motion sensors may include one or more of, but are not limited to, IMUs (inertial measurement units), gyroscopes, attitude sensors, compasses, etc. The mobile device 100 may transmit right 112A and left 112B audio channels to the right audio 110A and left audio 110B output components (e.g., earbuds) via a wired or wireless connection; the headset 108 may communicate head orientation and movement information to the device 100 via a wired or wireless connection.

FIG. 1B is a block diagram illustrating components of a system as illustrated in FIG. 1A, according to some embodiments. A mobile multipurpose device 100 such as a smartphone, tablet, or pad device may include, but is not limited to, one or more processors 104, a memory 130, one or more sensors 120, and a touch-enabled display 102.

Device 100 may include a touch-enabled display 102 via which content may be displayed to the user, and via which the user may input information and commands to the device 100. Display 202 may implement any of various types of touch-enabled display technologies.

Device 100 may also include one or more processors 104 that implement functionality of the mobile multipurpose device. Device 100 may also include a memory 130 that stores software (code 132) that is executable by the processors 104, as well as data 134 that may be used by the code 132 when executing on the processors 104. Code 132 and data 134 may, for example, include code and data for executing an operating system of the device 100, as well as code and data for implementing various applications on the device 100. Code 132 may also include, but is not limited to, program instructions executable by the processor 104 for implementing the spatial audio navigation system and methods as described herein. Data 134 may also include, but is not limited to, real-world map information, audio files, or other data that may be used by the spatial audio navigation system as described herein.

In various embodiments, processors 104 may be a uniprocessor system including one processor, or a multiprocessor system including several processors (e.g., two, four, eight, or another suitable number). Processors 104 may include central processing units (CPUs) configured to implement any suitable instruction set architecture, and may be configured to execute instructions defined in that instruction set architecture. For example, in various embodiments processors 104 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Processors 104 may employ any microarchitecture, including scalar, superscalar, pipelined, superpipelined, out of order, in order, speculative, non-speculative, etc., or combinations thereof. Processors 104 may include circuitry to implement microcoding techniques. Processors 104 may include one or more processing cores each configured to execute instructions. Processors 104 may include one or more levels of caches, which may employ any size and any configuration (set associative, direct mapped, etc.). In some embodiments, processors 104 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, processors 104 may include one or more other components for processing and rendering video and/or images, for example image signal processors (ISPs), coder/decoders (codecs), etc. In some embodiments, processors 104 may include at least one system on a chip (SOC).

Memory 130 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

The device 100 may include one or more position sensors 120 that enable a real-world location of the device 100 to be determined, for example GPS (global positioning system) technology sensors, dGPS (differential GPS) technology sensors, cameras, indoor positioning technology sensors, SLAM (simultaneous localization and mapping) technology sensors, etc.

A binaural audio device (e.g., headphones, headsets, wired or wireless earbuds, etc.), referred to as a headset 108, may be worn by the user. The headset 108 may include right audio 110A and left audio 110B output components (e.g., earbuds) and one or more motion sensors 106 used to detect and track motion and orientation of the user 190's head with respect to the real world. The motion sensors 106 may include one or more of, but are not limited to, IMUs (inertial measurement unit), gyroscopes, attitude sensors, compasses, etc. The mobile device 100 may transmit right 112A and left 112B audio channels to the right audio 110A and left audio 110B output components (e.g., earbuds) via a wired or wireless connection; the headset 108 may communicate head orientation and movement information to the device 100 via a wired or wireless connection.

FIGS. 2A and 2B illustrate embodiments of an example VR/MR system that may implement embodiments of the spatial audio navigation system and methods as described herein.

FIG. 2A illustrates a VR/MR system, according to at least some embodiments. In some embodiments, a VR/MR system may include a HMD 200 such as a helmet, goggles, or glasses that may be worn by a user 290. In some embodiments, the HMD 200 may be a stand-alone unit. However, in some embodiments, the VR/MR system may include a base station (not shown) that performs at least some of the functionality of the VR/MR system (e.g., rendering virtual content for display) and that communicates with the HMD 200 via a wired or wireless connection.

The HMD 200 may include sensors that collect information about the user 290's environment (video, depth information, lighting information, etc.) and information about the user 290 (e.g., the user's expressions, eye movement, head movement, gaze direction, hand gestures, etc.). Virtual content may be rendered based at least in part on the various information obtained from the sensors for display to the user 290. The virtual content may be displayed by the HMD 200 to the user 290 to provide a virtual reality view (in VR applications) or to provide an augmented view of reality (in MR applications). HMD 200 may implement any of various types of display technologies.

The HMD 200 may include one or more position sensors that enable a real-world location of the HMD 200 to be determined, for example GPS (global positioning system) technology sensors, dGPS (differential GPS) technology sensors, cameras, indoor positioning technology sensors, SLAM (simultaneous localization and mapping) technology sensors, etc.

The HMD 200 may provide binaural audio output (e.g., via right audio 210A and left audio 210B output components). For example, right audio 210A and left audio 210B output components may be over-the ear speakers or ear pieces integrated in the HMD 200 and positioned at or over the user's right and left ears, respectively. As another example, right audio 210A and left audio 210B output components may be right and left earbuds or headphones coupled to the HMD 200 by a wired or wireless connection.

FIG. 2B is a block diagram illustrating components of a VR/MR system as illustrated in FIG. 2A, according to some embodiments. In some embodiments, a VR/MR system may include a HMD 200 such as a headset, helmet, goggles, or glasses. In some embodiments, the HMD 200 may be a stand-alone unit. However, in some embodiments, the VR/MR system may include a base station (not shown) that performs at least some of the functionality of the VR/MR system (e.g., rendering virtual content for display) and that communicates with the HMD 200 via a wired or wireless connection.

HMD 200 may include a display 202 component or subsystem via which virtual content may be displayed to the user to provide a virtual reality view (in VR applications) or to provide an augmented view of reality (in MR applications). Display 202 may implement any of various types of display technologies. For example, HMD 200 may include a near-eye display system that displays left and right images on screens in front of the user 290's eyes, such as DLP (digital light processing), LCD (liquid crystal display) and LCoS (liquid crystal on silicon) technology display systems. As another example, HMD 200 may include a projector system that scans left and right images to the subject's eyes. To scan the images, left and right projectors generate beams that are directed to left and right displays (e.g., ellipsoid mirrors) located in front of the user 290's eyes; the displays reflect the beams to the user's eyes. The left and right displays may be see-through displays that allow light from the environment to pass through so that the user sees a view of reality augmented by the projected virtual content.

HMD 200 may also include a controller 204 comprising one or more processors that implements functionality of the VR/MR system. HMD 200 may also include a memory 230 that stores software (code 232) that is executable by the controller 204, as well as data 234 that may be used by the code 232 when executing on the controller 204. Code 232 and data 234 may, for example, include VR and/or AR application code and data for rendering and displaying virtual content to the user. Code 232 may also include, but is not limited to, program instructions executable by the controller 204 for implementing the spatial audio navigation system and methods as described herein. Data 234 may also include, but is not limited to, real-world map information, audio files, or other data that may be used by the spatial audio navigation system as described herein.

In various embodiments, controller 204 may be a uniprocessor system including one processor, or a multiprocessor system including several processors (e.g., two, four, eight, or another suitable number). Controller 204 may include central processing units (CPUs) configured to implement any suitable instruction set architecture, and may be configured to execute instructions defined in that instruction set architecture. For example, in various embodiments controller 204 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 204 may employ any microarchitecture, including scalar, superscalar, pipelined, superpipelined, out of order, in order, speculative, non-speculative, etc., or combinations thereof. Controller 204 may include circuitry to implement microcoding techniques. Controller 204 may include one or more processing cores each configured to execute instructions. Controller 204 may include one or more levels of caches, which may employ any size and any configuration (set associative, direct mapped, etc.). In some embodiments, controller 204 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 204 may include one or more other components, for processing and rendering video and/or images, for example image signal processors (ISPs), coder/decoders (codecs), etc. In some embodiments, controller 204 may include at least one system on a chip (SOC).

Memory 230 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 200 may include sensors 220 that collect information about the user's environment (video, depth information, lighting information, etc.), and information about the user (e.g., the user's expressions, eye movement, hand gestures, etc.). The sensors 220 may provide the collected information to the controller 204 of the HMD 200. Sensors 220 may include one or more of, but are not limited to, visible light cameras (e.g., video cameras), infrared (IR) cameras, IR cameras with an IR illumination source, Light Detection and Ranging (LIDAR) emitters and receivers/detectors, and laser-based sensors with laser emitters and receivers/detectors.

HMD 200 may include at least one inertial-measurement unit (IMU) 206 for detecting position, orientation, and motion of the HMD 200 and thus of the user's head with respect to the real world. Instead of or in addition to an IMU 206, HMD 200 may include gyroscopes, attitude sensors, compasses, or other sensor technologies for detecting position, orientation, and motion of the HMD 200 and thus of the user's head with respect to the real world.

HMD 200 may include one or more position sensors that enable a real-world location of the HMD 200 to be determined, for example GPS (global positioning system) technology sensors, dGPS (differential GPS) technology sensors, cameras, indoor positioning technology sensors, SLAM (simultaneous localization and mapping) technology sensors, etc.

HMD 200 may provide binaural audio output (e.g., via right audio 210A and left audio 210B output components). For example, right audio 210A and left audio 210B may be over-the-ear speakers or ear pieces integrated in the HMD 200 and positioned at or over the user's right and left ears, respectively. As another example, right audio 210A and left audio 210B may be right and left earbuds or headphones coupled to the HMD 200 by a wired or wireless connection. HMD may transmit right 212A and left 212B audio channels to the right audio 210A and left audio 210B output components via a wired or wireless connection.

Figure 2C:
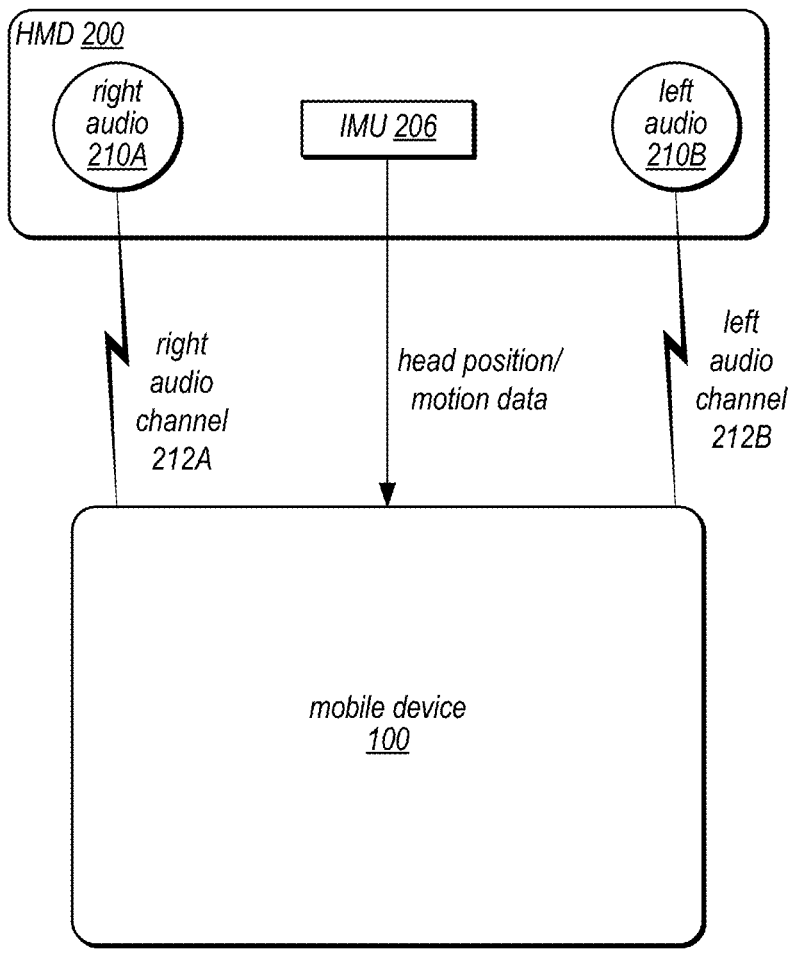
FIG. 2C illustrates a mobile multipurpose device used with a VR/MR system to implement embodiments of the spatial audio navigation system and methods as described herein.

In some embodiments, the spatial audio navigation system may be integrated in the HMD 200. However, in some embodiments as shown in FIG. 2C, a mobile multipurpose device 100 as illustrated in FIGS. 1A and 1B may be connected to the HMD 200 via a wired or wireless connection. The mobile multipurpose device 100 may support functionality of the spatial audio navigation system, receiving head position and motion information from the IMU 206 of the HMD 200 and transmitting right 212A and left 212B audio channels to the HMD 200 to be played on the HMD's binaural audio speakers or ear pieces 210A and 210B.

Figure 3:
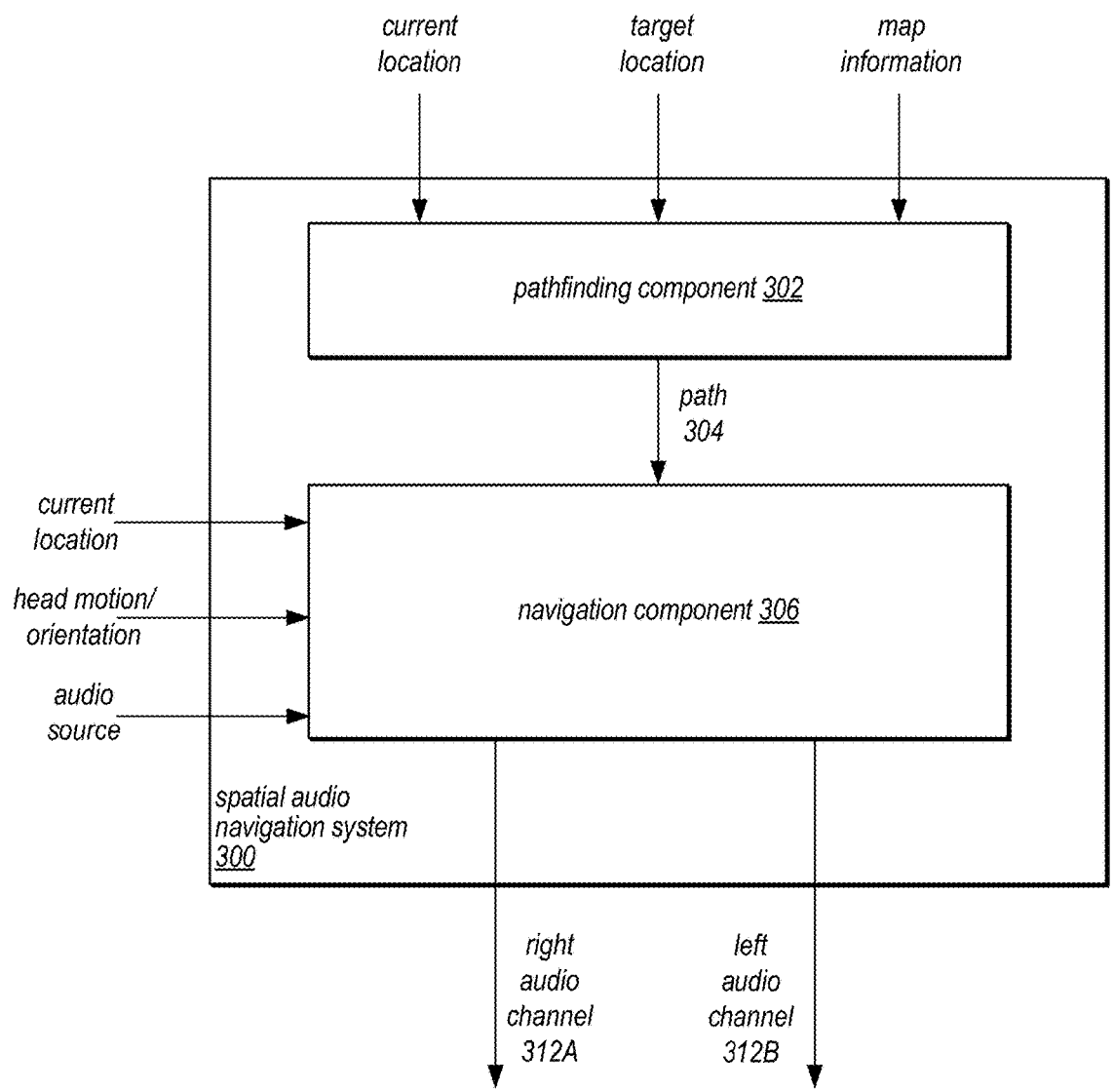
FIG. 3 illustrates components of and inputs to a spatial audio navigation system, according to some embodiments.

FIG. 3 illustrates components of and inputs to a spatial audio navigation system 300, according to some embodiments. Spatial audio navigation system 300 may be implemented by a mobile multipurpose device 100 and headset 108 as illustrated in FIGS. 1A and 1B, or by a HMD 200 as illustrated in FIGS. 2A and 2B, or by a mobile multipurpose device 100 and HMD 200 as illustrated in FIG. 2C. More generally, embodiments may be implemented in any device or system that includes binaural audio output and that provides head motion and orientation tracking.

In addition, embodiments of spatial audio navigation system 300 may be implemented in vehicle A/V systems in which the vehicle's location and orientation technology is used to determine location, motion, and orientation of the vehicle and in which the vehicle's speaker system is used to output the directional sounds to guide the user while driving to a target location, and in homes or other buildings in which a mobile multipurpose device or other technology is used to determine the location, orientation, and movement of the user while a home speaker system is used to output the directional sounds to guide the user.

In embodiments of the spatial audio navigation system 300, a current location, target location, and map information may be input to a pathfinding component 302 to determine a real world path 304 between the user's current location and the target location. The real-world current location of the user may be determined by location technology (e.g., GPU technology) of the device. The real-world target location may, for example, be provided by the user through an interface to spatial audio navigation system 300 on the device, or may be otherwise determined by or input to the spatial audio navigation system 300. The real-world map information may, for example, be provided from a database of map information used by a map or navigation application on the device.

After the path 304 is determined, a navigation component 306 of the spatial audio navigation system 300 may use directional audio played through the headset to guide the user on the path 304 from the current location to the target location. The user's current location may be tracked by the device and input to the navigation component 306. In addition, head orientation and motion may be tracked by sensors of the headset or HMD and input to the navigation component 306. The navigation component 306 then adjust the directionality of audio provided by an audio source as the user moves in the real world to guide the user along the path 304 to the target location. In some embodiments, the virtual directionality of the audio may be adjusted by attenuating one or more aspects of audio output to the left and/or right audio channels, including but not limited to volume, frequency, and reverberation. Other aspects of the audio may be adjusted based on the inputs, such as volume and type of audio, to assist in guiding the user along the path 304 to the target location.

The spatial audio navigation system 300 may output right 312A and left 312B audio channels to the headset via a wired or wireless connection so that the user hears the sound in a spatial audio sense. In other words, the user hears the sound as if the sound were coming from a real world location with accurate distance and direction. For example, the system 300 may play a sound through the headset so that the user hears the sound coming from their left, their right, straight ahead, behind, or at some angle. The direction that the sound seems to be coming from may change to guide the user on the path 304. For example, as the user approaches a left turn on the path 304, the sound may be moved to the left. In some embodiments, the system 300 may modulate the volume of the sound to give the user a sense of distance, for example to make it seem as if the sound was coming from three feet, ten feet, or fifty feet away. Instead of or in addition to adjusting the volume, other aspects of the audio may be attenuated to affect the virtual distance of the audio, including but not limited to frequency and reverberation. In some embodiments, the system 300 may change the sound based on detected events, for example by playing an alert or warning sound if the user has missed a turn or is approaching an obstacle. The navigation component 306 may use one or more spatial audio navigation methods to guide the user on the path 304. The spatial audio navigation methods are further described in relation to FIGS. 5C through 5I, FIGS. 6A through 6D, and 7A through 7C.

Figure 4:
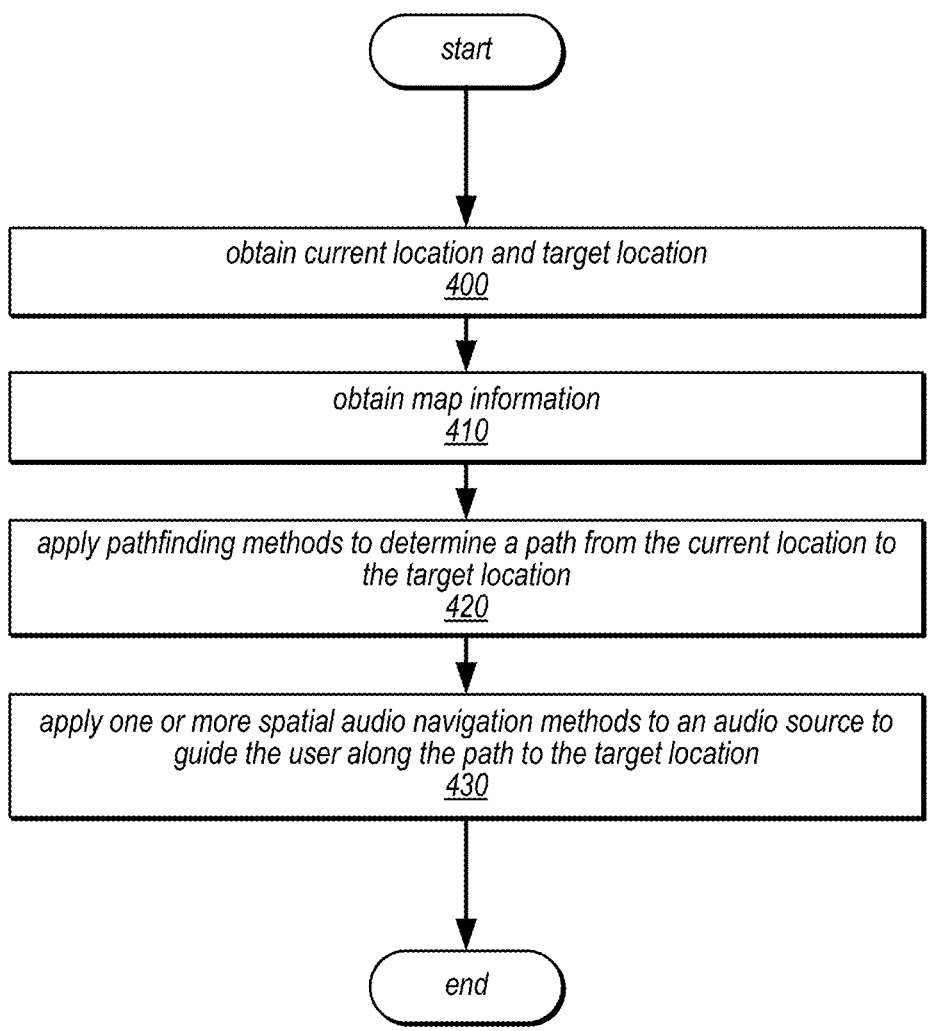
FIG. 4 is a high-level flowchart of a method that may be implemented by a spatial audio navigation system as illustrated in FIG. 3, according to some embodiments.

FIG. 4 is a high-level flowchart of a method that may be implemented by a spatial audio navigation system 300 as illustrated in FIG. 3, according to some embodiments. As indicated at 400, the spatial audio navigation system 300 may obtain or determine a current location and a target location. The real-world current location of the user may, for example, be determined by location technology (e.g., GPU technology) of the device. The real-world target location may, for example, be provided by the user through an interface to the spatial audio navigation system 300 on the device, or may be otherwise determined by or input to the spatial audio navigation system 300. As indicated at 410, map information may be obtained. The real-world map information may, for example, be obtained from a database of map information used by a map or navigation application on the device. The current location, target location, and map information may be input to a pathfinding component. As indicated at 420, the pathfinding component may apply one or more pathfinding methods to the input information to determine a path in the real world from the current location to the target location. The path may be input to a navigation component. As indicated at 430, the navigation component may apply one or more spatial audio pathfinding methods to an audio source to guide the user along the path to the target location. The user's current location, head orientation, and motion may be tracked by sensors of the headset or HMD and input to the navigation component and used in the spatial audio pathfinding methods along with the path to adjust left and right audio channels to provide directional audio cues to the user to guide the user to the target location.

FIGS. 5C through 5I, FIGS. 6A through 6D, and 7A through 7C graphically illustrate various spatial audio navigation methods that may be used in embodiments of a spatial audio navigation system as illustrated in FIGS. 1 through 4. In some embodiments, a particular method or methods to be used may be automatically determined by the system based on one or more factors including but not limited to knowledge about the user, what the user is doing (e.g., listening to music, on a phone call, or not listening to anything), the real-world environment as determined from the map information, and the audio source (e.g., what, if anything, the user is currently listening to). In some embodiments, the spatial audio navigation system may provide an interface that allows the user to select spatial audio navigation methods and sounds, or to specify preferences for spatial audio navigation including but not limited to what method(s) to be used, what sounds to be played, volume, and so on. In some embodiments, there may be predetermined settings for particular activities that the user can select from such as "bike ride", "walk", "run", or "driving".

Figure 5A:
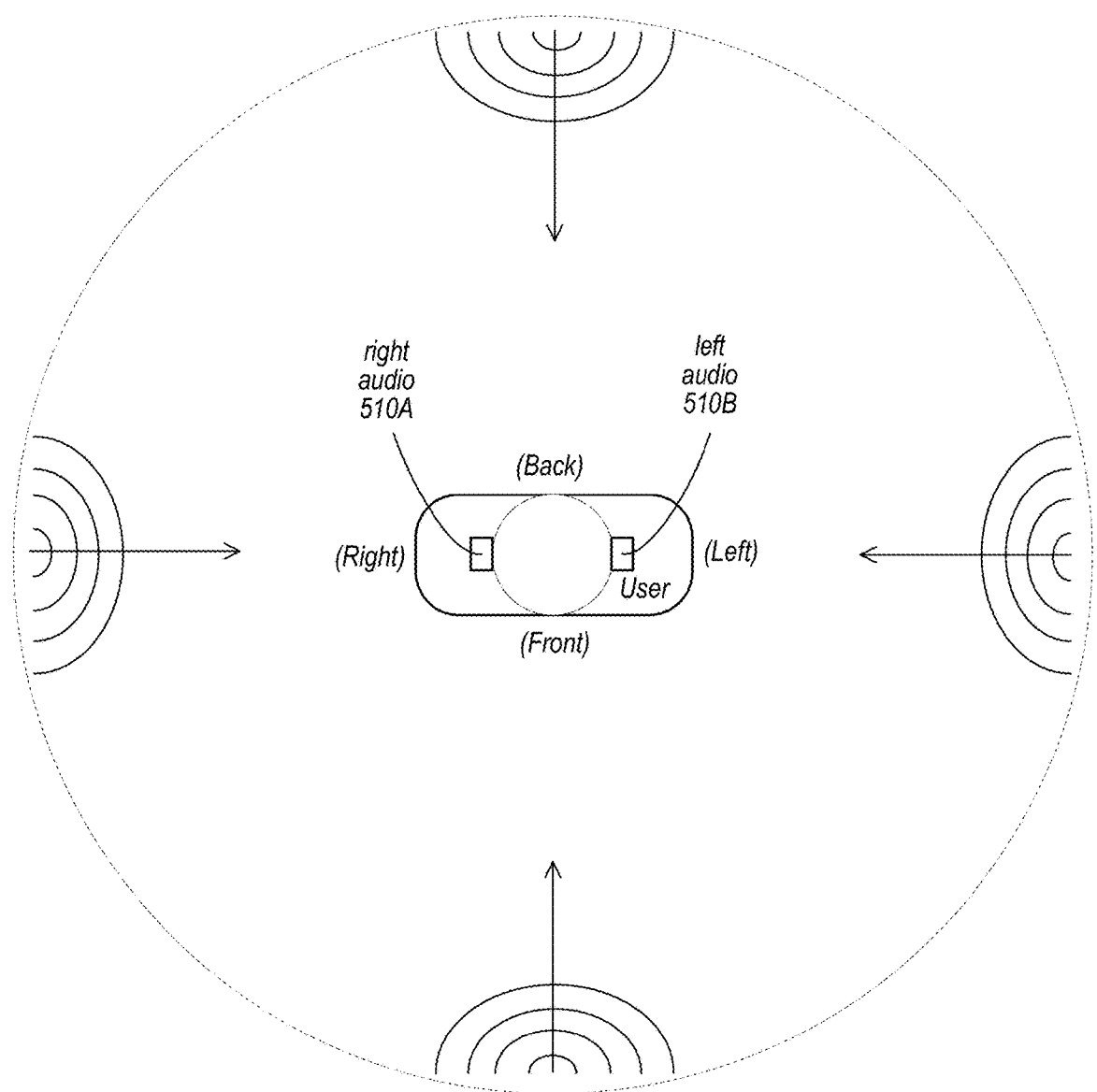
FIGS. 5A and 5B illustrate conventional audio output through a binaural audio device.
Figure 5B:
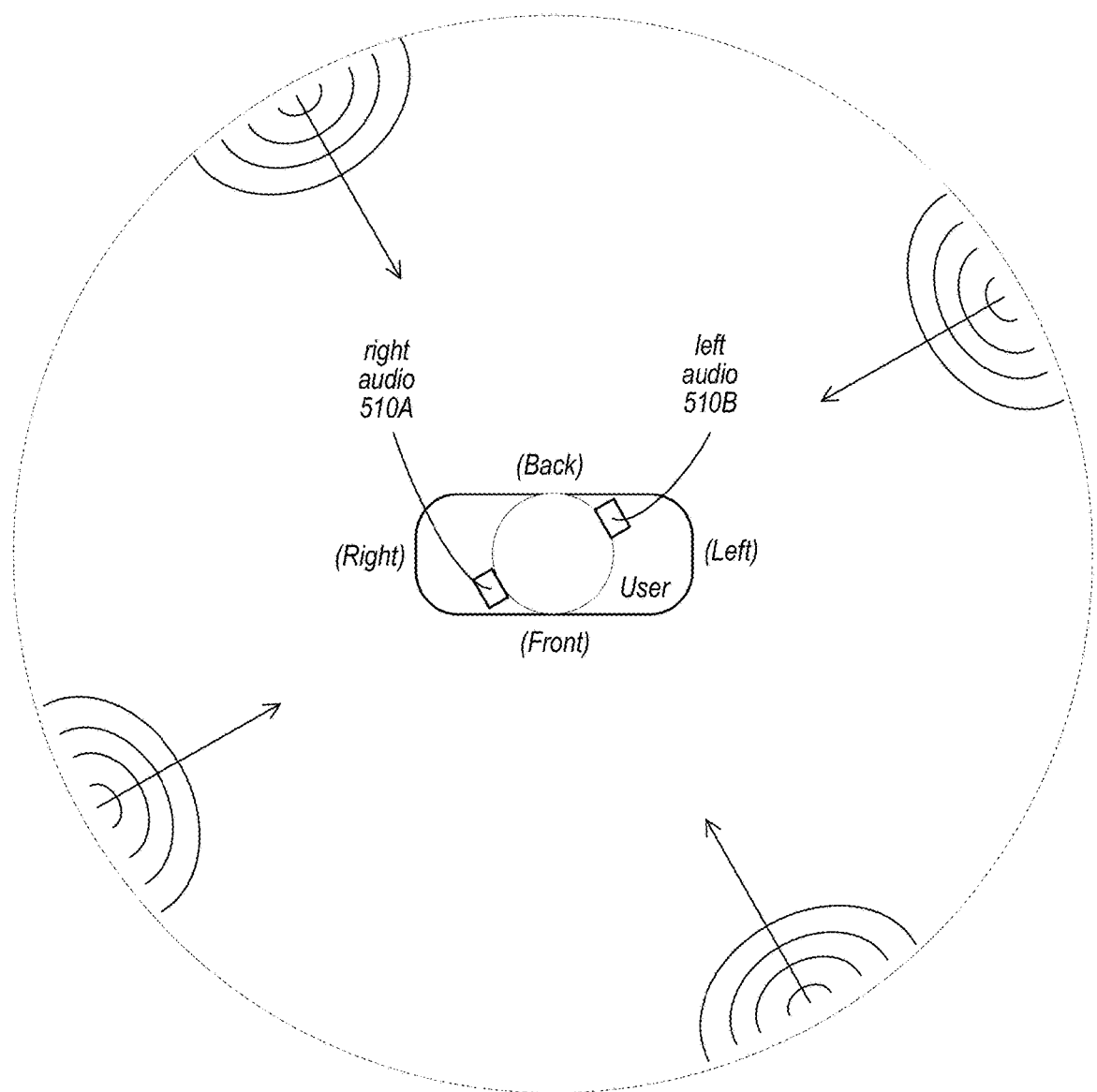

FIGS. 5A and 5B illustrate conventional audio output through a binaural audio device (right 510A and left 510B audio devices such as earbuds or headphones). FIG. 5A shows that the sound may seem to be coming from all around the user, or alternatively from the user's right and left sides. As shown in FIG. 5B, as the user turns their head, in conventional systems, the sound stays in the same relative position to the user's head.

FIGS. 5C through 5I graphically illustrate various spatial audio navigation methods that may be used by a spatial audio navigation system as illustrated in FIGS. 3 and 4, according to some embodiments.

Figure 5C:
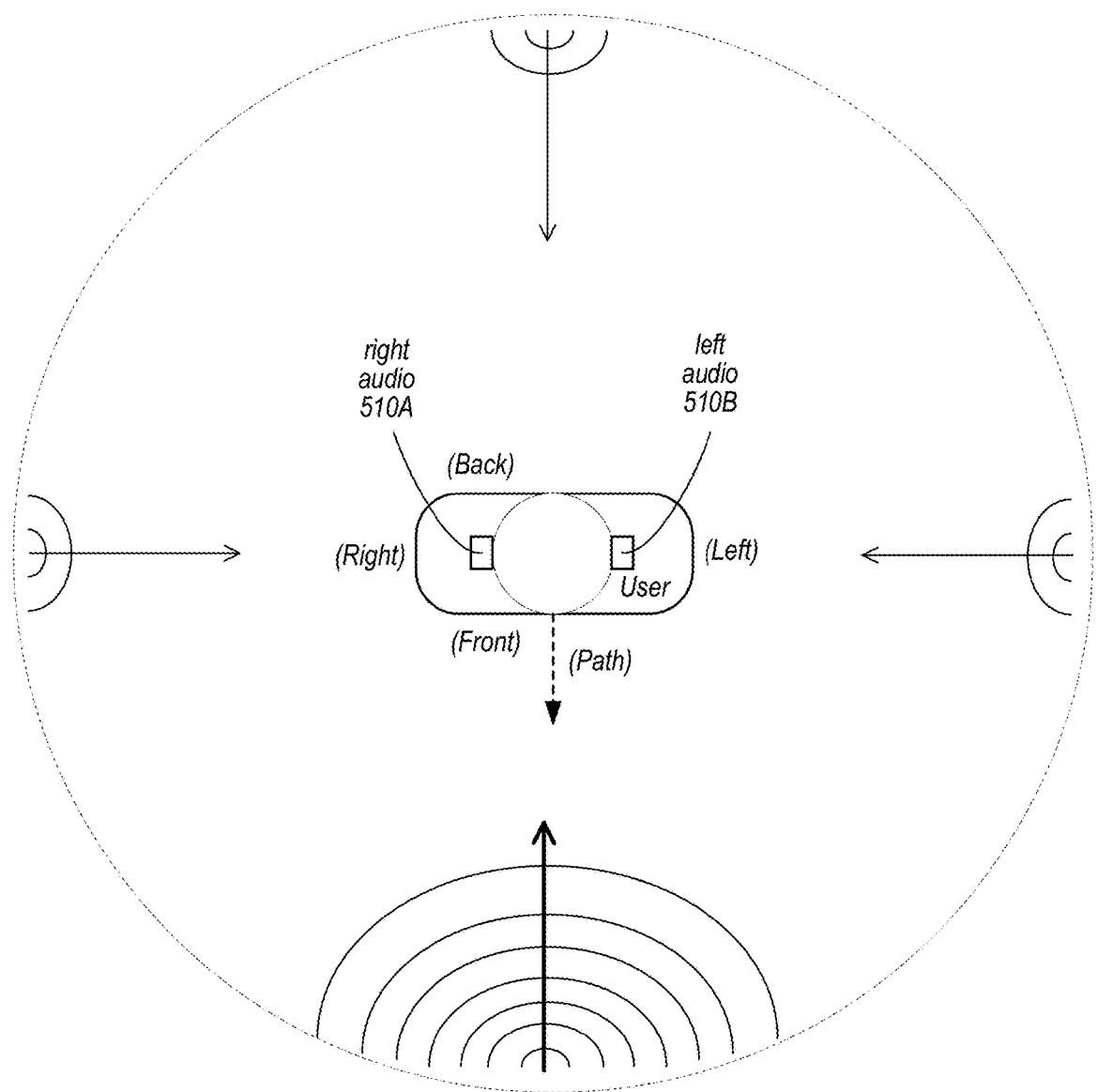
FIGS. 5C through 5I graphically illustrate various spatial audio navigation methods that may be used by a spatial audio navigation system as illustrated in FIGS. 3 and 4, according to some embodiments.
Figure 5D:
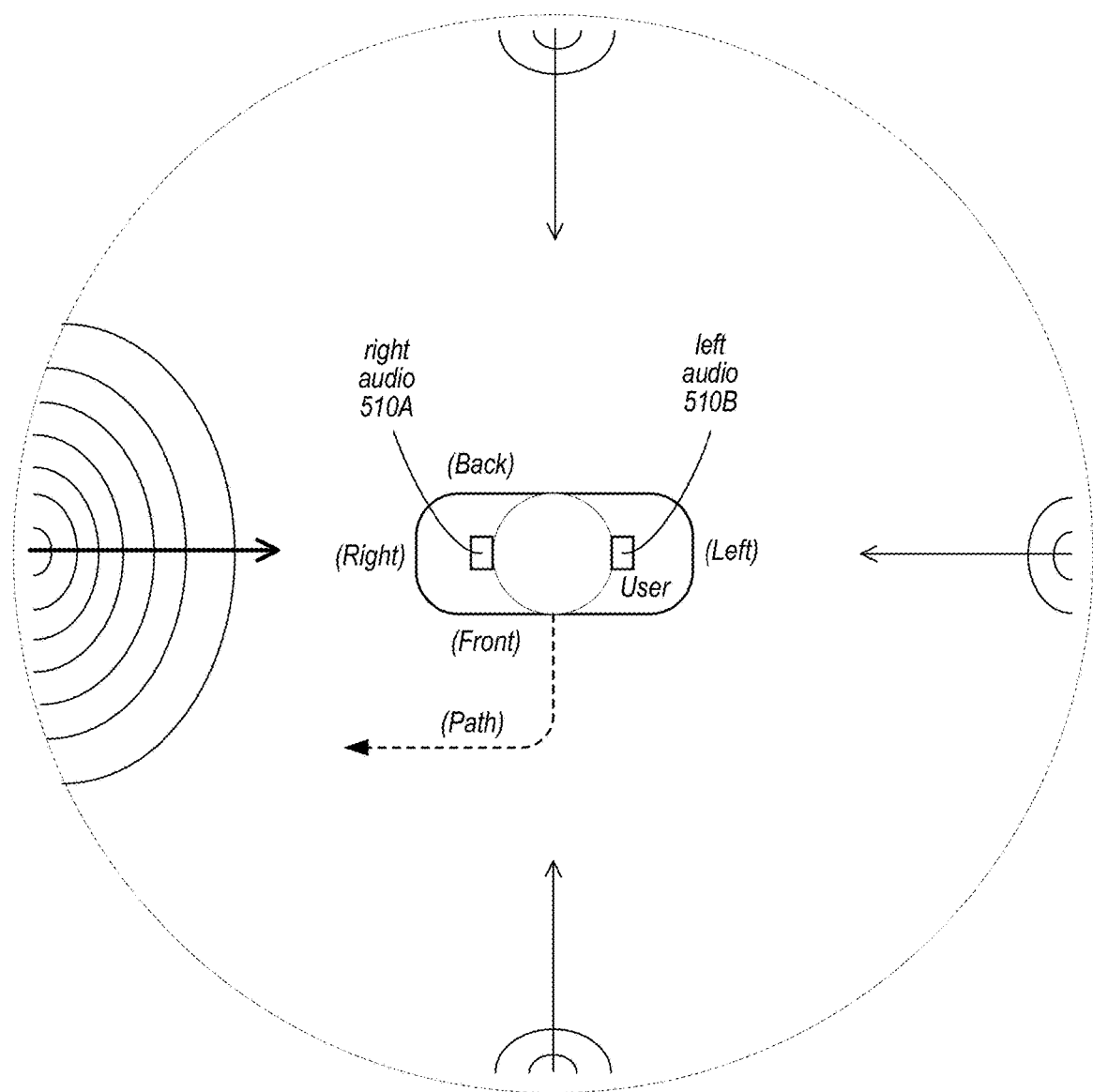
Figure 5E:
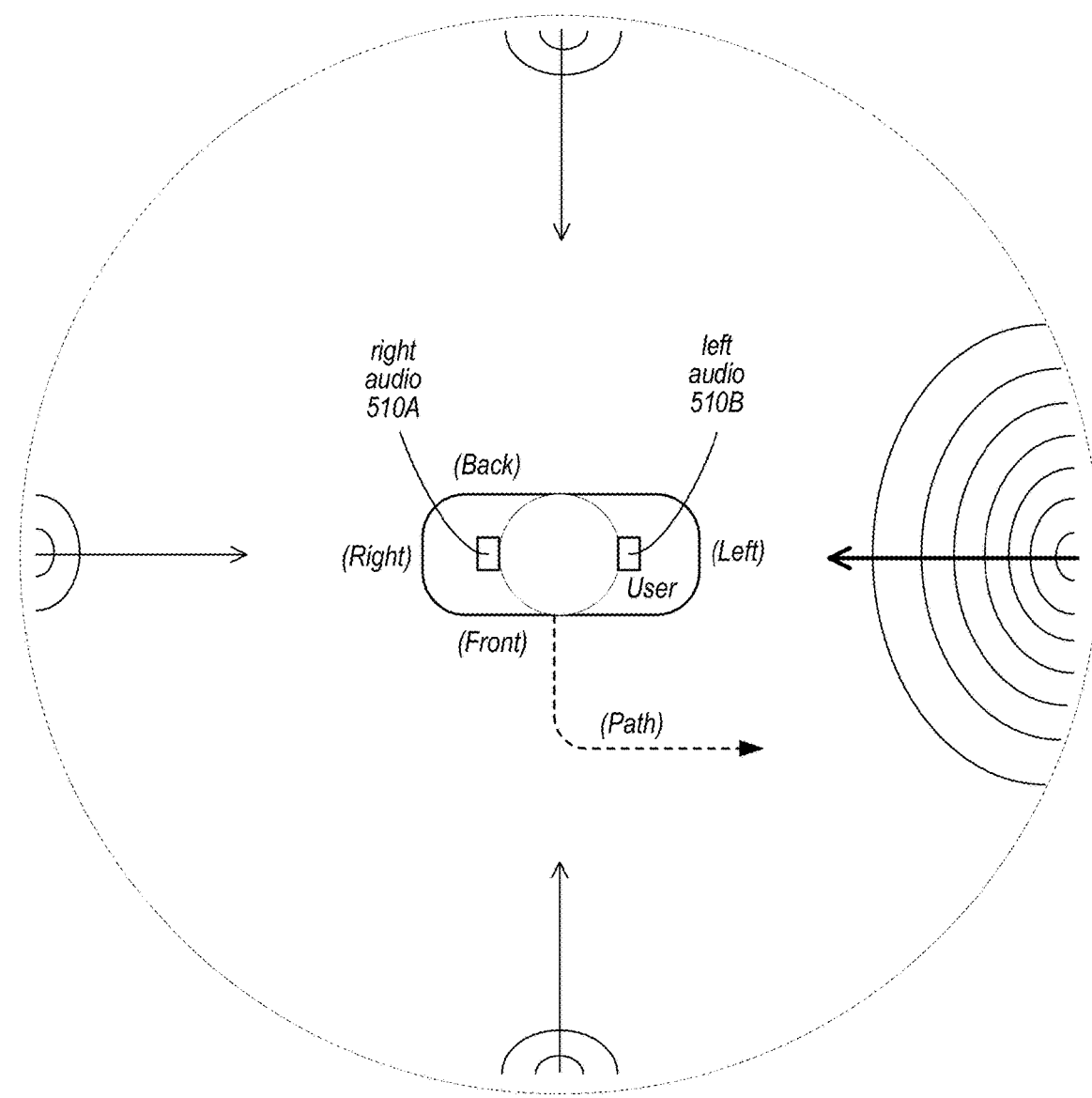

FIG. 5C illustrates a spatial audio navigation method in which the left and right audio output is adjusted to make the sound seem as if it is coming from in front of the user at some distance by increasing the volume of the sound in front of the user and/or by decreasing the volume of the sound or blocking the sound to the sides and back of the user. Instead of or in addition to volume, other aspects of the audio may be attenuated to affect the virtual distance and directionality of the audio, including but not limited to frequency and reverberation. This prompts the user to move towards the sound to follow the path. FIGS. 5D and 5E illustrate that the direction of the sound may be moved to the right or to the left of the user to prompt the user to make a right or left turn on the path, for example when the user is approaching or at a corner.

The method of FIGS. 5C through 5E may, for example, be used in a local direction of currently playing sound method. In this method, the user is listening to an audio source such as music, a podcast, or a phone call. Instead of the user hearing the audio source as simple stereo sound through the headset, the spatial audio navigation system positions the sound at some distance away from the user in the direction that the user should move to follow the path, and moves the sound along the path to direct the user to follow the path.

The method of FIGS. 5C through 5E may also be used in a sound tunneling method. In the sound tunneling method, ambient noise in the environment is sampled or simulated. For example, if the user is in a forest the ambient noise may include the rustling of trees, or if the user is in a city the ambient noise may include crowd and traffic sounds. This ambient noise is then played by the spatial audio navigation system. Obstacles to the sound are placed by the spatial audio navigation system that completely surround the user except in the direction that the user should move to follow the path. This causes a sound tunneling effect that prompts the user to follow the path in the direction of the ambient noise.

Figure 5F:
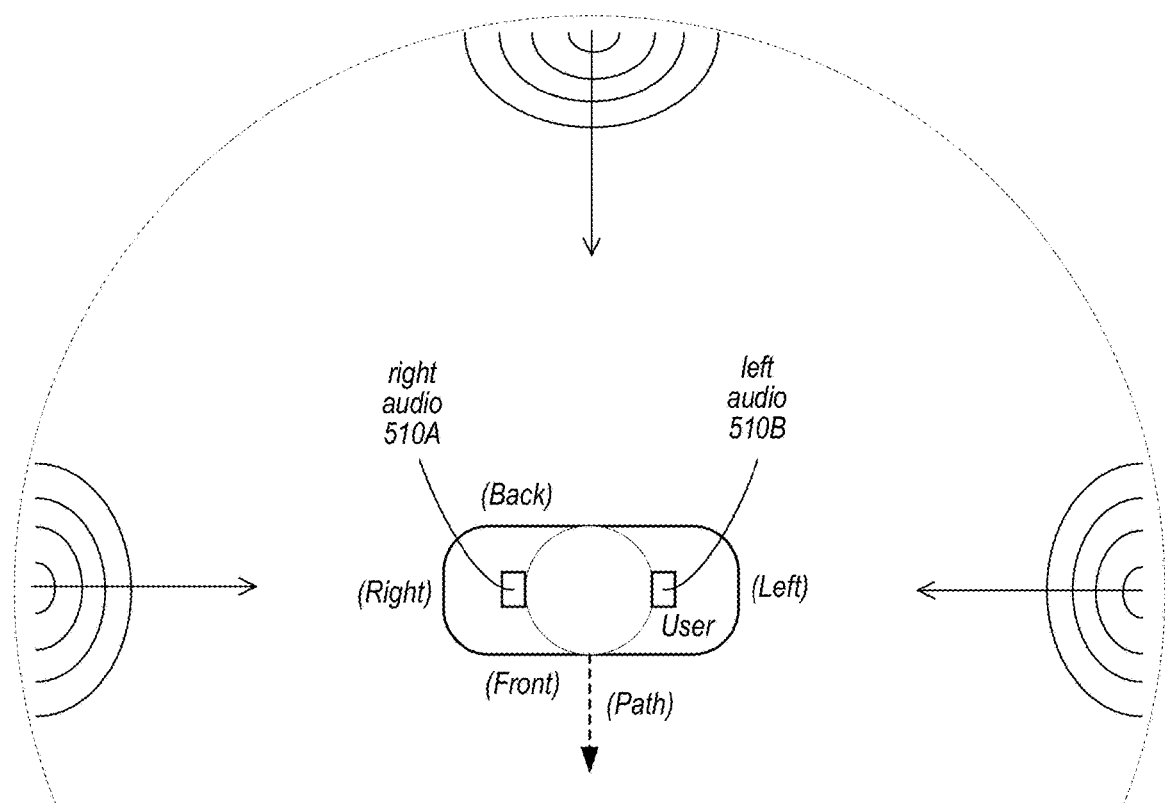
Figure 5G:
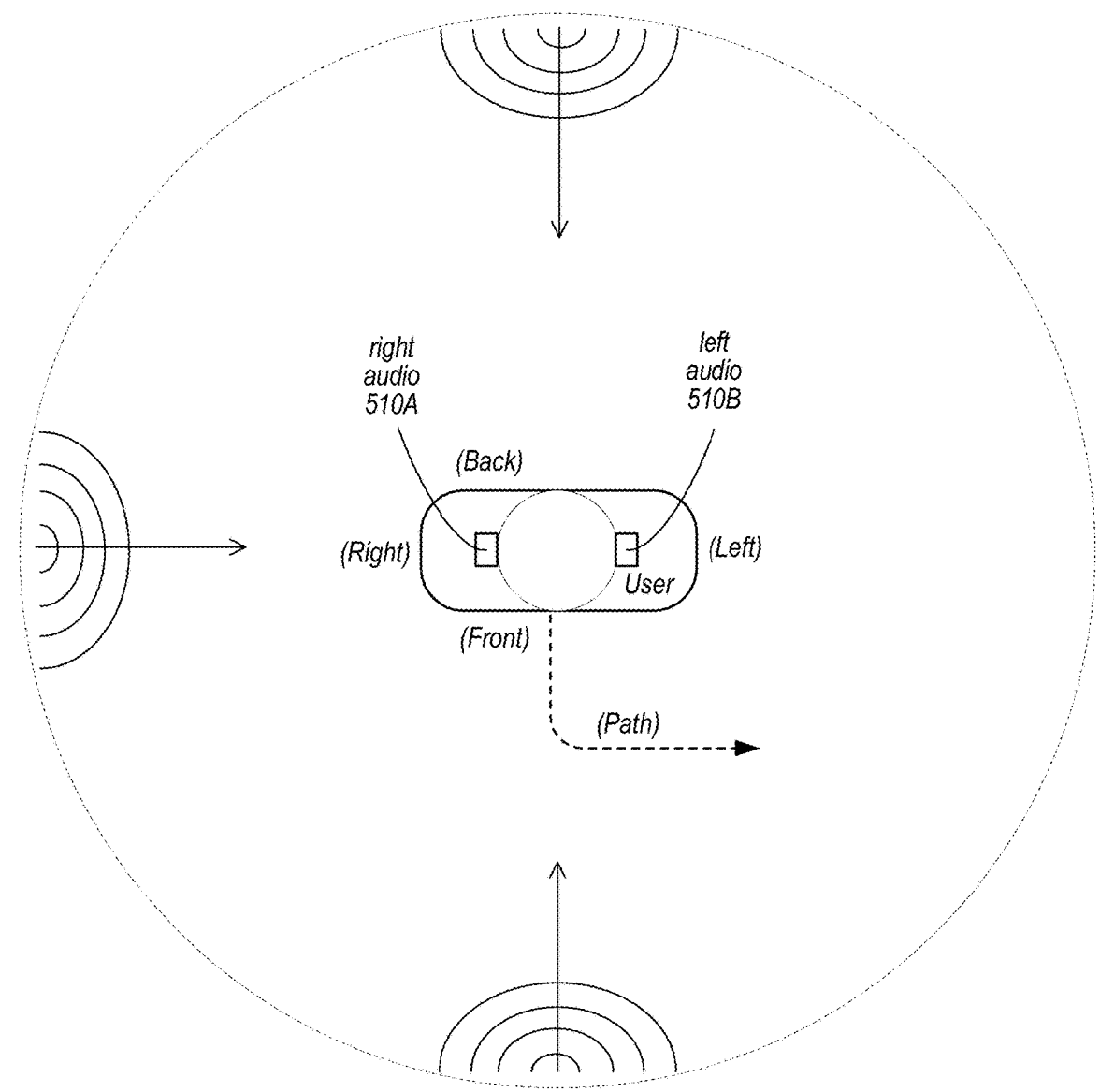

FIG. 5F illustrates a spatial audio navigation method in which the left and right audio output is adjusted to make the sound seem as if it is coming from all directions except for in front of the user by blocking the sound in front of the user. This prompts the user to move towards the gap in the sound to follow the path. FIG. 5G illustrates that the location of the gap in the sound may be moved to the right or to the left of the user to prompt the user to make a right or left turn on the path, for example when the user is approaching or at a corner.

The method of FIGS. 5F and 5G may, for example, be used in an ambient sound occlusion method. In the ambient sound occlusion method, noise in the environment is sampled or simulated by the spatial audio navigation system and played to the user. However, an obstacle is placed in the direction the user should move to follow the path and oriented to face the user. This obstacle blocks out the ambient noise in the direction that the user should move, causing an effect where there is a gap in the ambient noise that prompts the user to follow the path in the direction of the gap in the ambient noise.

Figure 5H:
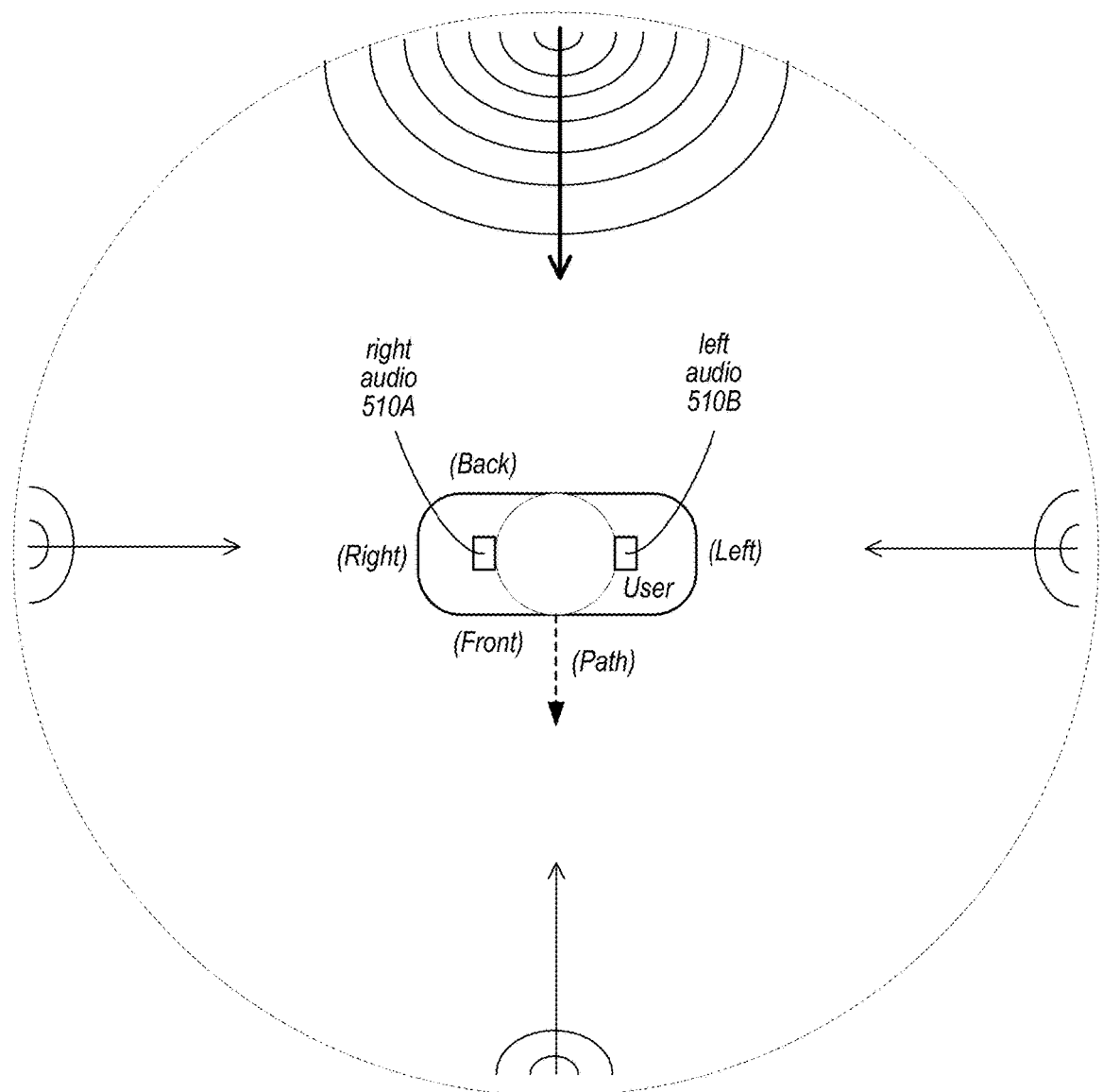

FIG. 5H illustrates a spatial audio navigation method in which the left and right audio output is adjusted to make the sound seem as if it is coming from behind the user at some distance by increasing the volume of the sound behind the user and/or by decreasing the volume of the sound or blocking the sound to the sides and front of the user. This prompts the user to move away from the sound to follow the path. The direction of the sound may be moved to the right or to the left behind the user to prompt the user to make a left or right turn on the path, for example when the user is approaching or at a corner. Instead of or in addition to volume, other aspects of the audio may be attenuated to affect the virtual distance and directionality of the audio, including but not limited to frequency and reverberation.

The method of FIG. 5H may, for example, be used in a sound chasing method. In the sound chasing method, a sound (e.g., the sound of a pack of wolves, train, etc.) is played so that it seems to be coming from some distance behind the user; as the user moves, the sound "chases" or follows the user to push the user along the path.

Figure 5I:
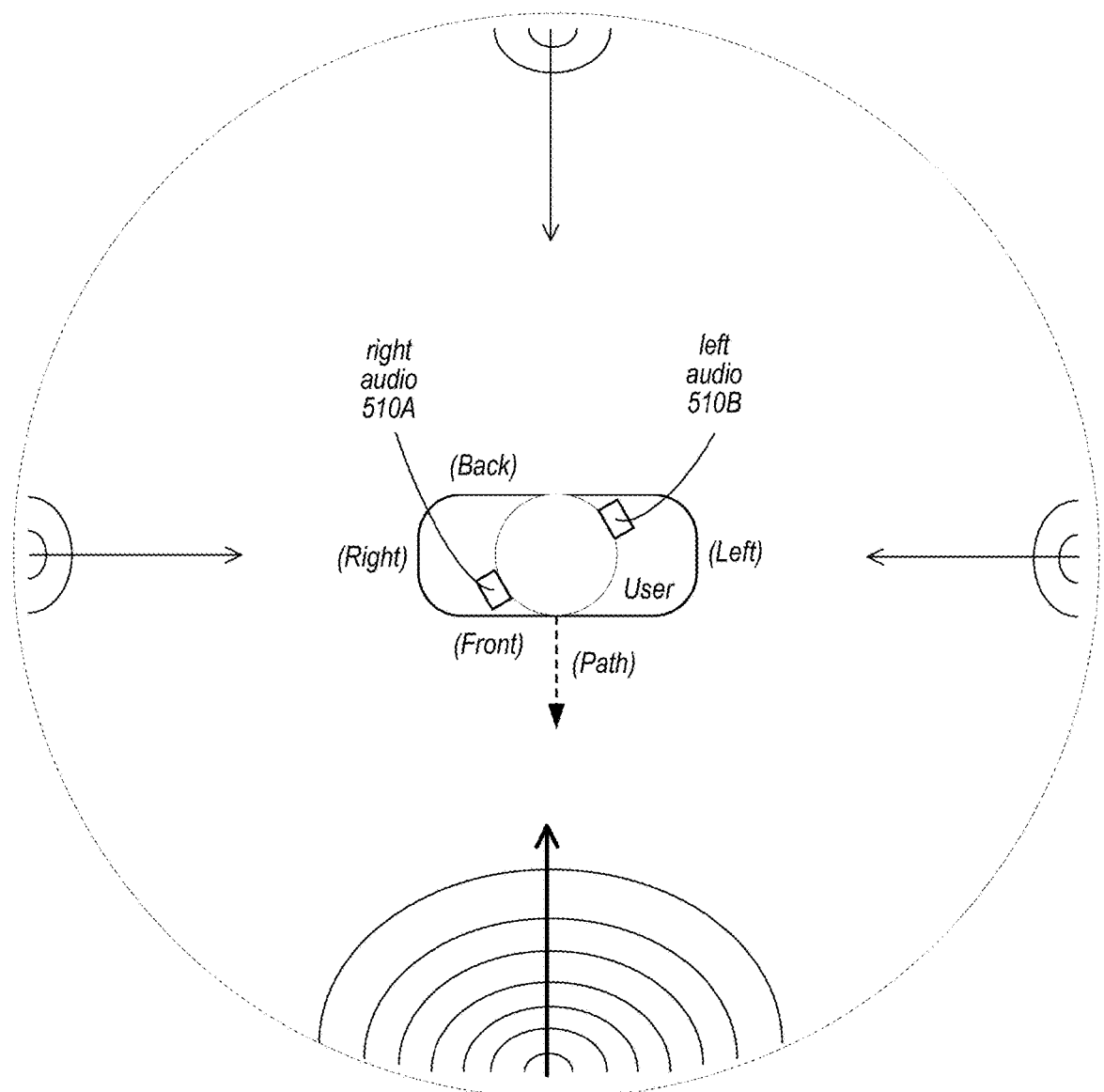

FIG. 5I illustrates that, in the methods as illustrated in FIGS. 5C through 5H, using FIG. 5C as an example, the spatial audio navigation system adjusts the left and right audio channels in response to motion and orientation of the user's head as detected and track by the IMU in the headset or HMD so that the sound stays on or in the direction of the path. As shown in FIG. 5C, the user is looking directly ahead, and the sound seems to the user to be coming from directly in front of the user at some distance. In FIG. 5I, the user has turned their head to the left, but instead of rotating with the user's head as illustrated in FIG. 5B the direction of the sound remains in the direction of the path.

Figure 6A:
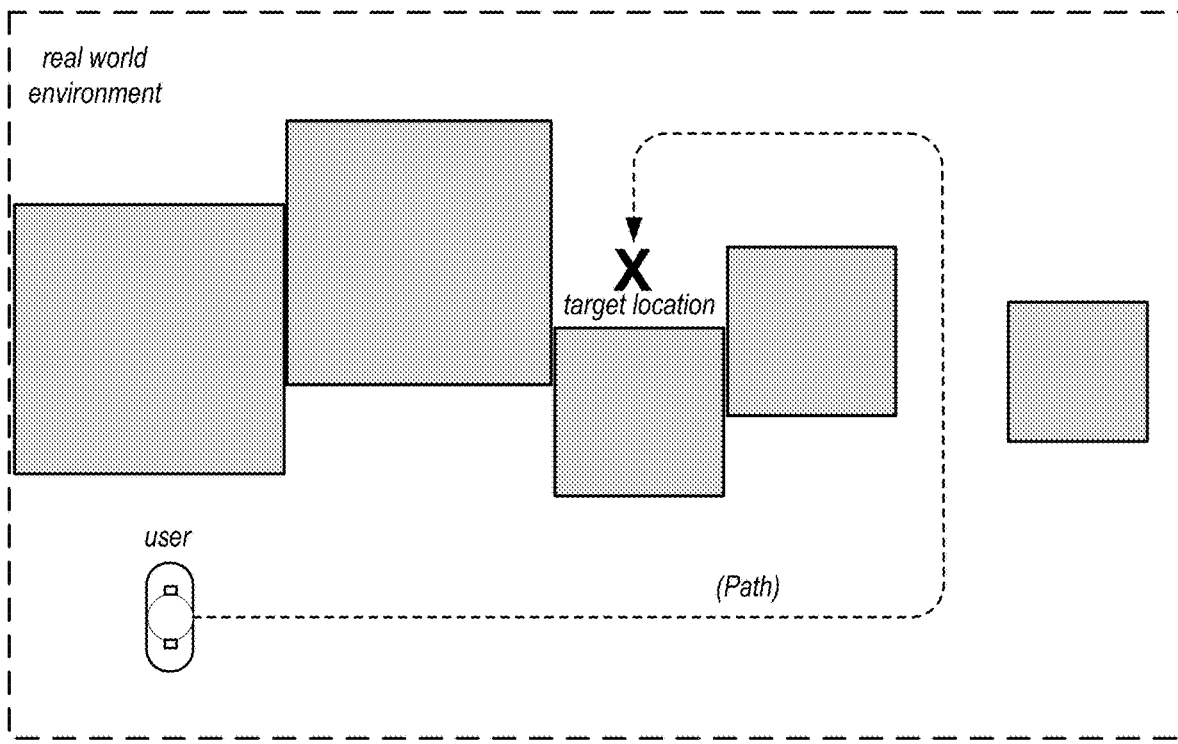
FIGS. 6A through 6D further illustrate spatial audio navigation methods, according to some embodiments.

FIGS. 6A through 6D further illustrate spatial audio navigation methods, according to some embodiments. FIG. 6A illustrates a path determined from a user to a target location (represented by the X) in a real-world environment that includes several obstacles. The target location may be another person, an item or object, a place, a landmark, etc. The path from the user's current location to the target location may be determined by the spatial audio navigation system using map information that includes knowledge of the obstacles (e.g., buildings, rivers, fences, etc.) and routes (e.g., streets, sidewalks, alleyways, passages, etc.).

Figure 6B:
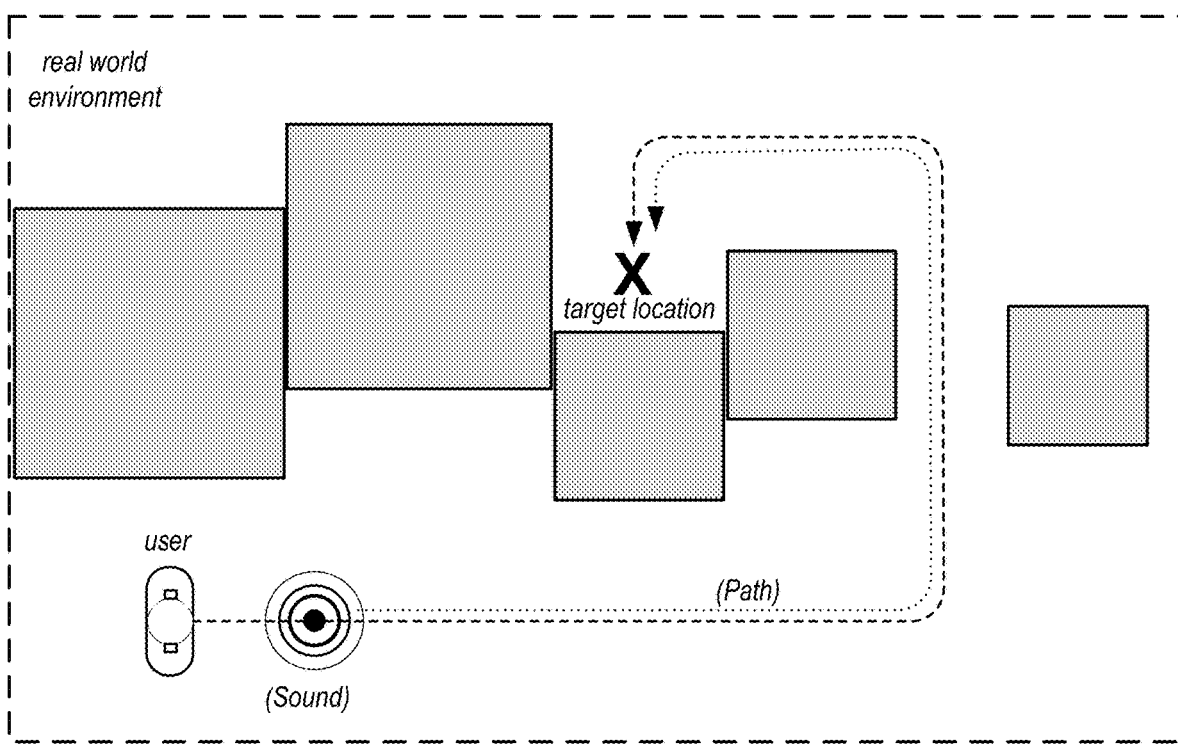

FIG. 6B illustrates a continuous path tracing method in which a sound (represented by the concentric circles) is moved such that it continuously follows the path. In some embodiments, when the sound reaches the end of the path, it returns to the beginning of the path and the process repeats.

Figure 6C:
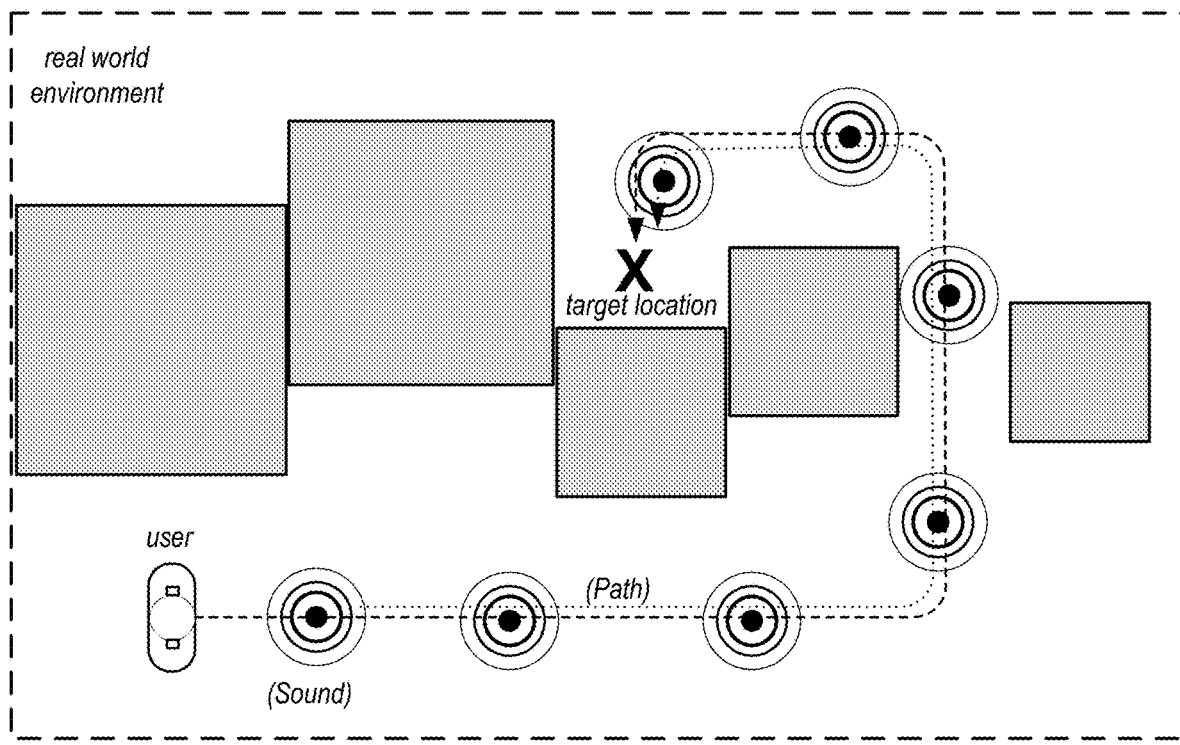

FIG. 6C illustrates a discrete path tracing method in which a sound is moved in discrete intervals along the path. In some embodiments, when the sound reaches the end of the path, it returns to the beginning of the path and the process repeats.

Figure 6D:
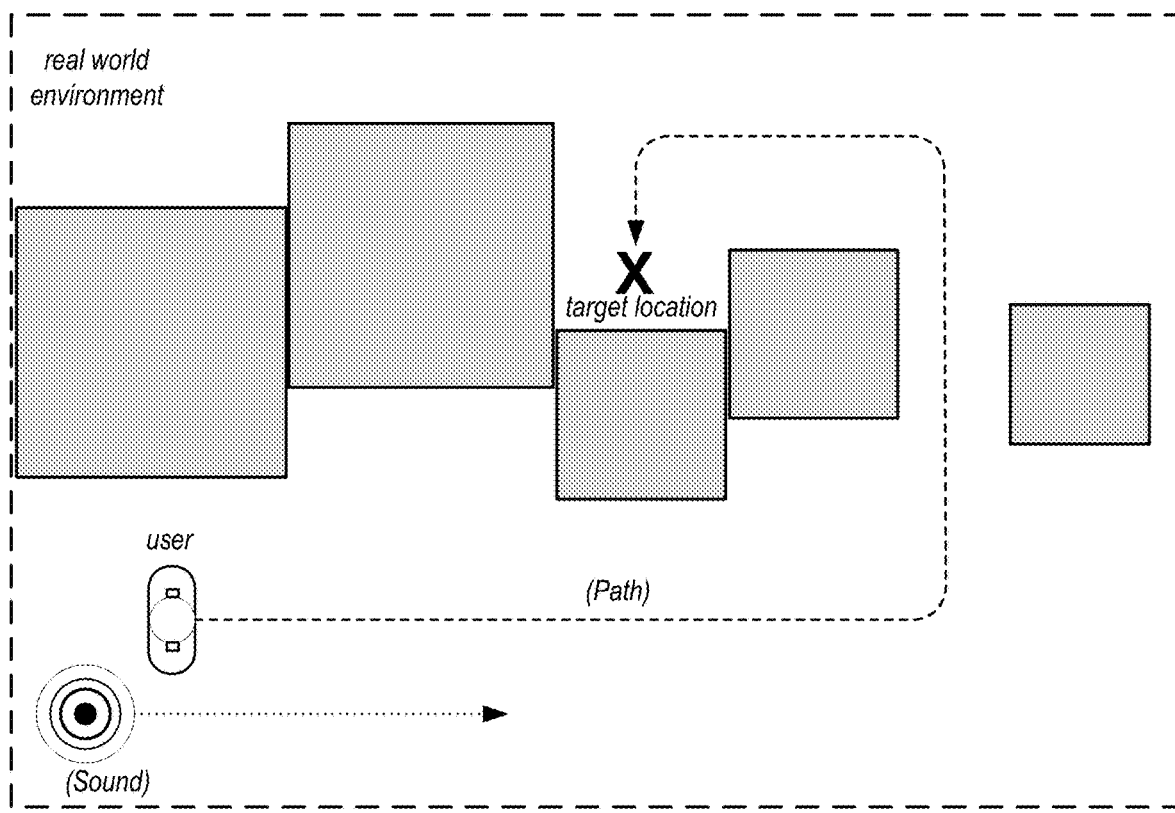

FIG. 6D illustrates a sound directionality method in which a sound moves from behind the user toward the direction the user needs to move to follow the path, stops at some distance in front of the user, and then repeats. The sound may be positioned at some distance away from the user's head, and may be positioned either on their left or right, for example depending on ear dominance.

Figure 7A:
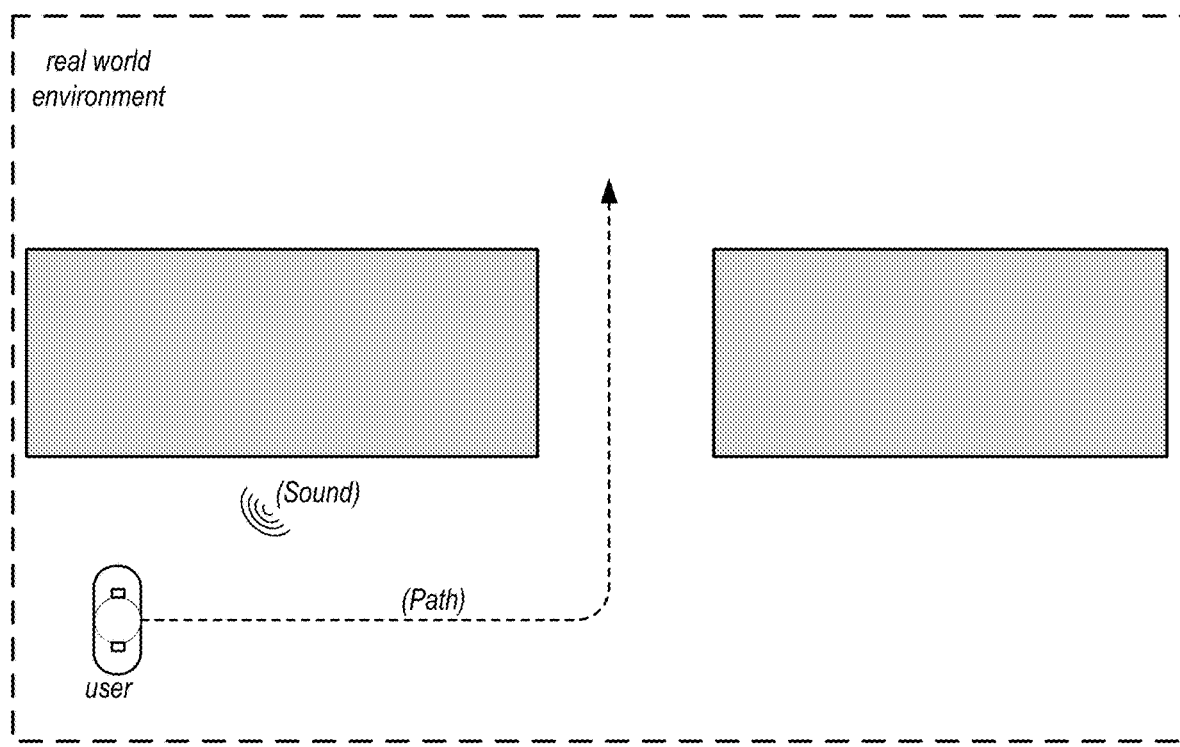
FIGS. 7A through 7C illustrate spatial audio navigation methods for handling turns, according to some embodiments.
Figure 7B:
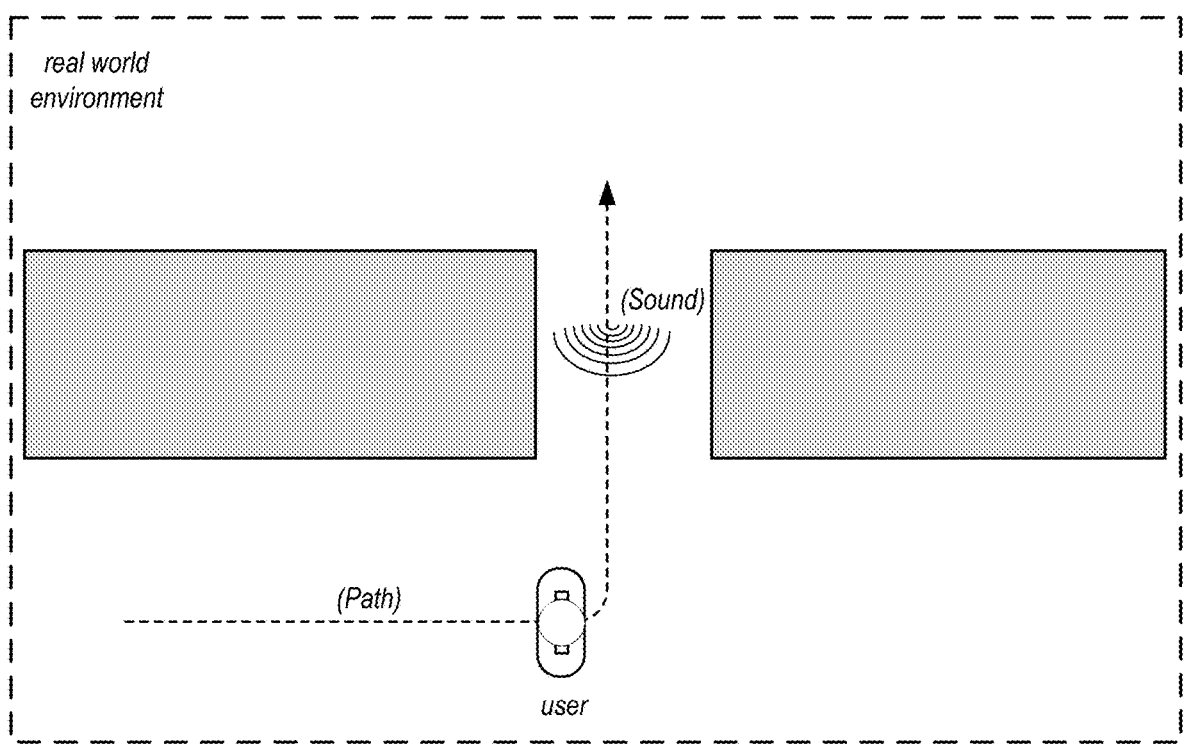
Figure 7C:
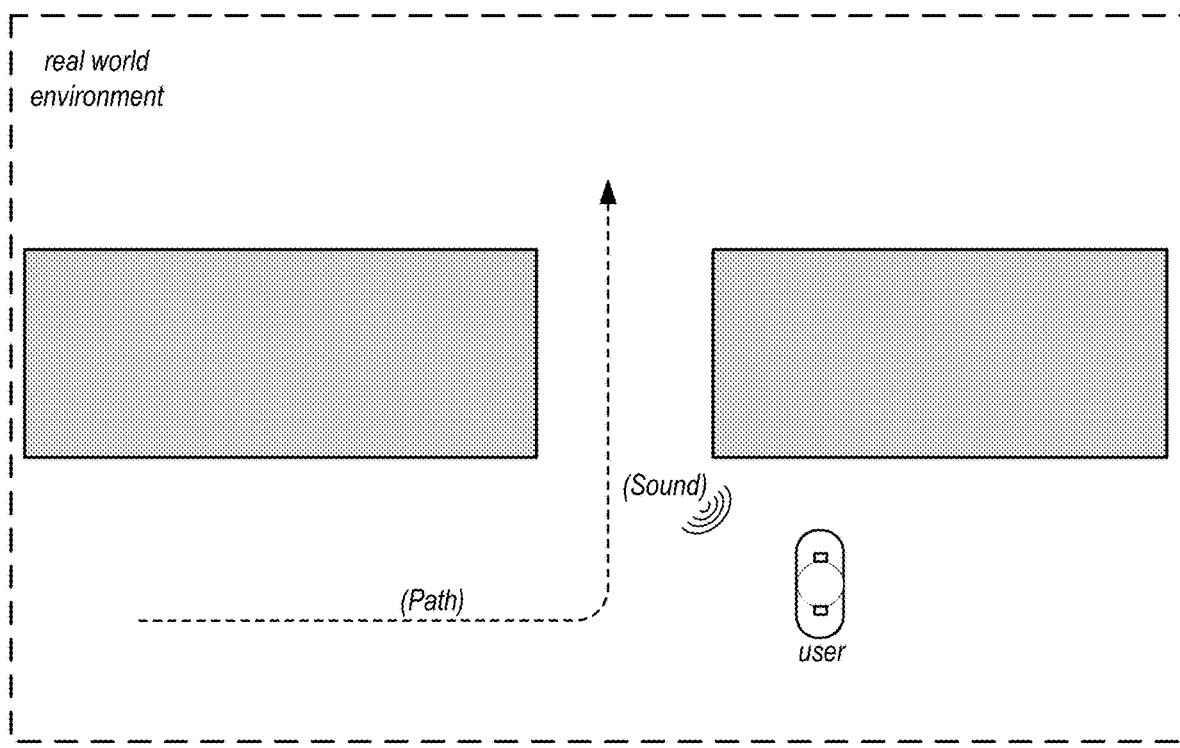

FIGS. 7A through 7C illustrate spatial audio navigation methods for handling turns, according to some embodiments. FIG. 7A illustrates a path determined for a user in a real-world environment that includes a turn. As the user approaches the turn, a sound may be played such that it seems that the sound is coming from in front of and to the left of the turn. The volume and position of the sound may be adjusted as the user approaches the turn. At FIG. 7B, as the user reaches the turn, the sound may be increased in volume and follows the path in the direction of the turn; in this case, the sound seems as if it is coming from the user's left. If the user follows the sound and makes the turn, the sound may decrease in volume or go away until the user approaches another turn in the path. In some embodiments, a particular sound or tone may be played to the user to indicate that the user made the correct turn and is still on the path. As shown in FIG. 7C, if the user misses the turn, the sound may decrease in volume and be moved so that it seems to be coming from behind the user to prompt the user that they have missed the turn. Alternatively, in some embodiments, an alert sound may be played when the user misses a turn. In some embodiments, if a user continues past a turn or otherwise goes off a path determined by the system, the system may recalculate a new path to the target location and begin directing the user on the new path using the spatial audio navigation methods. Instead of or in addition to volume, other aspects of the audio may be attenuated to affect the virtual distance and directionality of the audio, including but not limited to frequency and reverberation.

Example Use Cases

The following provides some example, non-limiting use cases for embodiments of the spatial audio navigation system and methods as described herein.

A bike rider or jogger may specify or request a five-mile path or loop for a ride or run via an interface to the spatial audio navigation system on their mobile multipurpose device (e.g., by using touch or voice commands). The user could then start listening to a music playlist and the spatial audio navigation system would then use the directionality of the music played through a binaural headset to guide the user on the path. One or more of the spatial audio navigation methods may be used. For example, a local direction of currently playing sound method may be used in which the spatial audio navigation system positions the sound at some distance away from the user in the direction that the user should move to follow the path, and moves the sound along the path to direct the user to follow the path.

A user may need to meet someone in a mall, city, park, or other environment. The user may use their mobile multipurpose device to find a location that the other person is at, or a location at which to meet. The target location can be input to the spatial audio navigation system via the interface. The spatial audio navigation system generates a path based on the user's current location, the target location, and map information. The spatial audio navigation system may then use one or more of the spatial audio navigation methods (e.g., continuous path tracing, discrete path tracing, local direction of currently playing sound, sound directionality, sound tunneling, and/or ambient sound occlusion) to guide the user on the path to the target location, and thus to the other person.

In a vehicle, the spatial audio navigation system may be used to augment the visual cues and/or vocal directions provided by a vehicle navigation system. For example, if the user is following a route displayed on a display screen by the vehicle's navigation system (either built-in or provided by a connected mobile multipurpose device), music or other audio being played by the vehicle's speakers may be directionalized by the spatial audio navigation system to help guide the user on the route using directional audio cues. For example, if a left turn is approaching, the source of the music may be moved to make it seem that the music is coming from the left. The spatial audio navigation techniques may also be integrated with the vocal directions provided by the navigation system. For example, when approaching a left turn at First Street, the system may say "turn left on to First Street." However, instead of the vocal command coming from around or in front of the user, the command may be made to seem that it is coming from the left of the vehicle to provide a directional audio cue as to the direction the user needs to turn.

In a user's home, items such as keys or wallets may be misplaced. A mobile multipurpose device may locate the item (e.g., via a dongle or "dot" placed on the item that the device can locate) or may remember a last location of the item (e.g., using computer vision or other technology via which the device records and tags locations of items). If the user cannot find the item, the user could ask the device to locate the item (e.g., "Find my keys.) The spatial audio navigation system may then use directional audio cues played through a headset or through the home's speaker system to guide the user to the item.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system for guiding a user along a path, the system comprising:
    a mobile device, comprising:
        one or more processors;
        one or more position sensors to detect and track a current location of the mobile device; and
        a memory comprising program instructions executable by the one or more processors to:
            determine a target location of the mobile device;
            determine a path from the current location to the target location; and
            control virtual directionality and distance of sound played through a binaural audio device based on the current location of the mobile device relative to the path,
            wherein, to control the virtual directionality and distance of sound played through the binaural audio device based on the current location of the mobile device relative to the path, the program instructions are executable by the one or more processors to apply a spatial audio navigation method in which the sound is moved continuously along the path.

2. The system as recited in claim 1, wherein the system further includes the binaural audio device, wherein the binaural audio device is connected to the mobile device by a wired or wireless connection, and wherein the program instructions are further executable by the one or more processors to adjust the virtual directionality of the sound played through the binaural audio device based at least in part on data indicative of a motion and orientation of the binaural audio device.

3. The system as recited in claim 1, wherein the program instructions are further executable by the one or more processors to determine the path from the current location to the target location based at least in part on map information.

4. The system as recited in claim 1, wherein the system further includes the binaural audio device, wherein the binaural audio device includes left and right audio output components, and wherein the virtual directionality and distance of the sound played through the binaural audio device are controlled by adjusting one or more of volume, frequency, or reverberation of left and right audio channels transmitted to the left and right audio output components of the binaural audio device by the mobile device over the wired or wireless connection.

5. The system as recited in claim 1, wherein the sound played through the binaural audio device includes one or more of music, a telephone conversation, an audio book, a podcast, a radio broadcast, ambient noise sampled from or simulated for a real environment, simulated sounds including tones and white noise, or recorded sounds.

6. The system as recited in claim 1, wherein, to control virtual directionality and distance of sound played through the binaural audio device based on the current location of the mobile device relative to the path, the program instructions are further executable by the one or more processors to apply a spatial audio navigation method in which the sound is moved continuously along the path.

7. The system as recited in claim 1, wherein, to control virtual directionality and distance of sound played through the binaural audio device based on the current location of the mobile device relative to the path, the program instructions are further executable by the one or more processors to apply a spatial audio navigation method in which the sound is moved in discrete intervals along the path.

8. The system as recited in claim 1, wherein, to control virtual directionality and distance of sound played through the binaural audio device based on the current location of the mobile device relative to the path, the program instructions are further executable by the one or more processors to apply a spatial audio navigation method in which the sound is positioned at a distance from the current location of the binaural audio device in a direction along the path.

9. The system as recited in claim 1, wherein, to control virtual directionality and distance of sound played through the binaural audio device based on the current location of the mobile device relative to the path, the program instructions are further executable by the one or more processors to apply a spatial audio navigation method in which the sound moves from a position behind the current location of the binaural audio device on the path to a position in front of the current location of the binaural audio device on the path.

10. The system as recited in claim 1, wherein, to control virtual directionality and distance of sound played through the binaural audio device based on the current location of the mobile device relative to the path, the program instructions are further executable by the one or more processors to apply a spatial audio navigation method in which sampled or simulated ambient noise is played in a direction along the path and blocked in other directions to cause a sound tunneling effect.

11. The system as recited in claim 1, wherein, to control virtual directionality and distance of sound played through the binaural audio device based on the current location of the mobile device relative to the path, the program instructions are further executable by the one or more processors to apply a spatial audio navigation method in which sampled or simulated ambient noise is blocked in a direction along the path and played in other directions to cause a gap in the ambient noise.

12. The system as recited in claim 1, wherein, to control virtual directionality and distance of sound played through the binaural audio device based on the current location of the mobile device relative to the path, the program instructions are further executable by the one or more processors to apply a spatial audio navigation method in which the sound is played in a direction opposite that of the path.

13. The system as recited in claim 1, wherein the system further includes the binaural audio device, wherein the binaural audio device is a headset, and wherein the mobile device is a mobile multipurpose device.

14. The system as recited in claim 1, wherein the system further includes the binaural audio device, wherein the mobile device is a head-mounted display device, and wherein the binaural audio device is one of a headset or speakers integrated in the head-mounted display device.

15. A method, comprising:
performing, by a mobile device comprising one or more processors:
determining a current location and a target location;
determining a path from the current location to the target location; and
adjusting one or more of volume, frequency, or reverberation of left and right audio channels transmitted to left and right audio output components of a binaural audio device to control directionality and distance of sound played through the binaural audio device based on the current location of the mobile device relative to the path,
wherein controlling the virtual directionality and distance of sound played through the binaural audio device based on the current location of the mobile device relative to the path includes applying a spatial audio navigation method in which the sound is moved continuously along the path.

16. The method as recited in claim 15, further comprising determining the current location based on position data provided by one or more position sensors of the mobile device configured to detect and track the current location of the mobile device.

17. The method as recited in claim 15, further comprising determining the path from the current location to the target location based at least in part on map information.

18. The method as recited in claim 15, further comprising adjusting one or more of volume, frequency, or reverberation of the left and right audio channels transmitted to the left and right audio output components of the binaural audio device based at least in part on data indicative of motion and orientation of binaural audio device.

19. A spatial audio navigation system, comprising:
an audio headset, comprising:
left and right audio output components; and one or more motion sensors that detect and track motion and orientation of the audio headset; and a mobile multipurpose device, comprising:

one or more processors;

one or more position sensors that detect and track location of the device; and a memory comprising program instructions executable by the one or more processors to:

determine a target location;

determine location of the mobile multipurpose device based at least in part on position sensor data;

determine a path to the target location based at least in part on map information; and adjust one or more of volume, frequency, or reverberation of left and right audio channels transmitted to the left and right audio output components of the binaural audio device over a wired or wireless connection based at least in part on position sensor data and motion sensor data to control directionality and distance of sound played through the binaural audio device, wherein, to control the virtual directionality and distance of sound played through the binaural audio device based on the current location of the mobile device relative to the path, the program instructions are executable by the one or more processors to apply a spatial audio navigation method in which the sound is moved continuously along the path.

* * * * *